US012789513B2

(12) United States Patent
Koshikawa et al.

(10) Patent No.: US 12,789,513 B2

(45) Date of Patent: Nov. 10, 2026

(54) THERMALLY CONDUCTIVE SHEET PRODUCT AND METHOD FOR PRODUCING SAME

(71) Applicant: Shin-Etsu Chemical Co., Ltd., Tokyo (JP)

(72) Inventors: Hidenori Koshikawa, Annaka (JP); Akihiro Endo, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 122 days.

(21) Appl. No.: 18/579,081

(22) PCT Filed: Jul. 4, 2022

(86) PCT No.: PCT/JP2022/026593

§ 371 (c)(1),
(2) Date: Jan. 12, 2024

(87) PCT Pub. No.: WO2023/286648

PCT Pub. Date: Jan. 19, 2023

(65) Prior Publication Data

US 2024/0316910 A1 Sep. 26, 2024

(30) Foreign Application Priority Data

Jul. 14, 2021 (JP) ................................ 2021-116031

(51) Int. Cl.

| | |
|---|---|
| ***B32B 27/08*** | (2006.01) |
| ***B32B 27/36*** | (2006.01) |
| ***B32B 33/00*** | (2006.01) |
| ***B32B 37/24*** | (2006.01) |
| ***B32B 37/26*** | (2006.01) |
| *B32B 38/00* | (2006.01) |

(52) U.S. Cl.

CPC .............. *B32B 27/08* (2013.01); *B32B 27/36* (2013.01); *B32B 33/00* (2013.01); *B32B 37/24* (2013.01); *B32B 37/26* (2013.01); *B32B 2037/243* (2013.01); *B32B 2037/268* (2013.01); *B32B 2038/0076* (2013.01); *B32B 2250/02* (2013.01); *B32B 2255/10* (2013.01); *B32B 2255/26* (2013.01); *B32B 2264/1023* (2020.08); *B32B 2264/302* (2020.08); *B32B 2264/303* (2020.08); *B32B 2305/30* (2013.01); *B32B 2307/206* (2013.01); *B32B 2307/302* (2013.01); *B32B 2307/536* (2013.01); *B32B 2307/7376* (2023.05)

(58) Field of Classification Search

None

See application file for complete search history.

(56) References Cited

U.S. PATENT DOCUMENTS

| | | | | |
|---|---|---|---|---|
| 2006/0063017 A1 | 3/2006 | Funahashi | | |
| 2008/0254247 A1 * | 10/2008 | Asaine | ................ | C09D 183/04 428/40.9 |
| 2015/0240075 A1 | 8/2015 | Imada et al. | | |
| 2017/0121583 A1 | 5/2017 | Koshikawa et al. | | |

FOREIGN PATENT DOCUMENTS

| | | | |
|---|---|---|---|
| CN | 100433312 | C | 11/2008 |
| CN | 107286891 | A | 10/2017 |
| EP | 0 799 693 | A2 | 10/1997 |
| JP | 9-207275 | A | 8/1997 |
| JP | 2001-284504 | A | 10/2001 |
| JP | 2014-61617 | A | 4/2014 |
| JP | 2015-67737 | A | 4/2015 |
| JP | 2017-82090 | A | 5/2017 |
| JP | 6204916 | B2 | 9/2017 |
| JP | 2019-11423 | A | 1/2019 |
| TW | 201731914 | A | 9/2017 |

OTHER PUBLICATIONS

International Search Report (PCT/ISA/210) issued in PCT/JP2022/026593, dated Sep. 13, 2022.

Written Opinion of the International Searching Authority (PCT/ISA/237) issued in PCT/JP2022/026593, dated Sep. 13, 2022.

* cited by examiner

*Primary Examiner* — Sheeba Ahmed

(74) *Attorney, Agent, or Firm* — Birch, Stewart, Kolasch & Birch, LLP

(57) ABSTRACT

The present invention provides: a thermally conductive sheet product wherein both surfaces of a fluorine rubber-based thermally conductive sheet are protected from foreign substances and the like, and excellent setting workability is achieved between a heat generation member and a heat dissipation member; and a method for producing this thermally conductive sheet product.

A thermally conductive sheet product which is obtained by bonding electrically insulating films to both surfaces of a thermally conductive sheet that is formed of a cured product of a thermally conductive fluorine-containing curable composition containing (A) a linear polyfluoro compound which comprises two or more alkenyl groups in each molecule, while having a perfluoro polyether structure in the main chain, (B) a fluorine-containing organohydrogen siloxane which comprises a perfluoroalkyl group or a perfluorooxyalkyl group in each molecule, or alternatively comprises a perfluoroalkylene group or a perfluorooxyalkylene group, while additionally containing two or more groups (SiH groups), wherein a hydrogen atom is directly bonded to a silicon atom, in each molecule, and which does not comprise an alkoxy group that is directly bonded to a silicon atom in the molecule.

(C) a platinum group metal-based catalyst and (D) a specific amount of a thermally conductive filler.

27 Claims, 1 Drawing Sheet

THERMALLY CONDUCTIVE SHEET PRODUCT AND METHOD FOR PRODUCING SAME

TECHNICAL FIELD

The present invention relates to a thermally conductive sheet product that includes a thermally conductive sheet composed of a cured product obtained by curing a fluorine-containing curable composition, and electrically insulating films attached on both sides of the thermally conductive sheet, and to a method for producing the same.

BACKGROUND ART

A thermally conductive sheet is interposed between a heat-generating member that generates unnecessary heat during operation, such as a semiconductor, for example, a CPU, an LSI, or an IGBT, and a heat-dissipating member, such as a heat spreader or a heat sink, and thereby plays a role to bypass the heat from the heat-generating member to the heat-dissipating member efficiently. In particular, such semiconductors have come to generate an increased amount of heat as a result of the recent advancements in, for example, performance, functionality, and miniaturization, and various thermally conductive sheets have been proposed to address a risk that the semiconductors may malfunction or be broken at an elevated temperature.

A thermally conductive sheet is obtained by thermally curing a thermally conductive composition into a sheet form. An example of the thermally conductive compositions is an addition reaction-curable thermally conductive silicone composition (Patent Document 1: JP-A H09-207275). However, a thermally conductive sheet composed of a cured product of the above silicone composition has a problem in that the thermally conductive sheet is easily swollen or degraded with a solvent, such as toluene, alcohol, or gasoline, and encounters difficulties in maintaining its performance when used in an environment where the sheet is exposed to an automotive oil, such as ATF or CVTF.

Thus, in recent years, fluororubber-based thermally conductive sheets have been proposed. Examples include thermally conductive fluorine-containing curable compositions that give cured products having excellent oil resistance and thermal conductivity, and thermally conductive fluorine-containing cured products composed of cured products obtained by curing the above compositions (Patent Document 2: JP-A 2017-082090).

Incidentally, a film is sometimes attached to a side of a thermally conductive sheet that will be brought into contact with a heat-generating member or a heat-dissipating member, for the purpose of protecting the side from, for example, adhesion of foreign matter, scratches, and fouling until the thermally conductive sheet that has been produced is interposed between a heat-generating member and a heat-dissipating member. The film is usually removed at the time of interposing and thus the film needs to be easily releasable from the thermally conductive sheet (Patent Document 3: JP-A 2001-284504).

When, however, the adhesiveness of the surface of the sheet impairs the workability in interposing the thermally conductive sheet between a heat-generating member and a heat-dissipating member, the interposing may take place while leaving the film as such without removal. When, for example, the thermally conductive sheet is inserted from the lateral side into a narrow space between a heat-generating member and a heat-dissipating member after the film has been removed, difficulties are encountered in accomplishing the insertion because the sheet adheres to the member and stops in the course of the insertion. When such a situation is expected, smooth insertion can be realized by inserting the sheet without removing the film. In this case, the film is interposed between the heat-generating member and the heat-dissipating member while remaining attached on the sheet, and therefore the film need not have releasability from the sheet.

As a fluororubber-based thermally conductive sheet to which a film is attached, a heat-transfer sheet is disclosed in which a thermally conductive filler is disposed in a matrix binder composed of a cured product of a fluorine compound (Patent Document 4: JP-A 2019-011423).

In the heat-transfer sheet disclosed in Patent Document 4, a release sheet is attached to only one side of the heat-transfer sheet. Thus, problems often occur; for example, foreign matter adheres to the side free of the release sheet, or the side is damaged. Furthermore, the side free of the release sheet often adheres to a heat-generating member or a heat-dissipating member and makes it difficult to insert the heat-transfer sheet into a narrow space between the members.

PRIOR ART DOCUMENTS

Patent Documents

Patent Document 1: JP-A H09-207275
Patent Document 2: JP-A 2017-082090
Patent Document 3: JP-A 2001-284504
Patent Document 4: JP-A 2019-011423

SUMMARY OF INVENTION

Technical Problem

The present invention has been made in view of the above circumstances, and an object of the present invention is to provide a thermally conductive sheet product that includes a fluororubber-based thermally conductive sheet protected on both sides from foreign matter and the like, that can be produced by a press forming method or the like, and that is interposable between a heat-generating member and a heat-dissipating member with excellent workability, and to provide a method for producing the same.

Solution to Problem

The present inventors have carried out intensive studies to achieve the above object and have consequently found that a thermally conductive sheet product produced in such a manner that electrically insulating films are attached to both sides of a thermally conductive sheet composed of a cured product obtained by curing a thermally conductive fluorine-containing curable composition having a specific chemical composition and excellent oil resistance and thermal conductivity can protect the sheet from foreign matter and the like and attains enhanced workability when being interposed between a heat-generating member and a heat-dissipating member. The present inventors have thereby completed the present invention.

Accordingly, the present invention provides a thermally conductive sheet and a method for producing the same described below.

[1]

A thermally conductive sheet product including a thermally conductive sheet and electrically insulating films attached on both sides of the thermally conductive sheet, the thermally conductive sheet being composed of a cured product of a thermally conductive fluorine-containing curable composition containing:

(A) 100 parts by weight of a linear polyfluoro compound having two or more alkenyl groups in one molecule and having a perfluoropolyether structure in a main chain:

(B) a fluorine-containing organohydrogensiloxane having, in one molecule, one or more selected from perfluoroalkyl groups, perfluorooxyalkyl groups, perfluoroalkylene groups, and perfluorooxyalkylene groups, and further having two or more hydrogen atoms directly bonded to silicon atoms (SiH groups), and free of an alkoxy group directly bonded to a silicon atom in the molecule, in an amount such that the amount of hydrogen atoms directly bonded to silicon atoms in the component (B) is 0.50 to 3.0 mol per 1 mol of alkenyl groups contained in the w % bole of the composition;

(C) a platinum group metal-based catalyst in an amount of 0.1 to 2,000 ppm in terms of the weight of platinum group metal atoms with respect to the component (A); and (D) 100 to 4,000 parts by weight of a thermally conductive filler.

[2]

The thermally conductive sheet product according to [1], wherein the electrically insulating films have a thickness of 1 to 200 μm.

[3]

The thermally conductive sheet product according to [1] or [2], wherein the electrically insulating films are films of at least one selected from the group consisting of polyolefins, polyimides, polyamides, polyesters, aromatic polyether ketones, fluorine-containing polymers, polyvinyl chlorides, and paper.

[4]

The thermally conductive sheet product according to any one of [1] to [3], wherein the electrically insulating films are polyethylene terephthalate (PET) films.

[5]

The thermally conductive sheet product according to any one of [1] to [4], wherein at least one of the electrically insulating films is treated with a fluorine-containing silicone release agent on a side in contact with the thermally conductive sheet.

[6]

The thermally conductive sheet product according to [5], wherein the fluorine-containing silicone release agent is an organopolysiloxane having one or more perfluoroalkyl groups or perfluorooxyalkyl groups.

[7]

The thermally conductive sheet product according to [6], wherein the perfluoroalkyl groups or the perfluorooxyalkyl groups are groups having the following general formula (1) or general formula (2):

$$C_{f''}F_{2f''+1}— \qquad (1)$$

wherein f" is an integer of 1 to 10,

[Chem. 1]

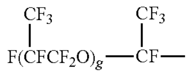

(2)

wherein g" is an integer of 1 to 30.

[8]

The thermally conductive sheet product according to any one of [1] to [7], wherein the thermally conductive fluorine-containing curable composition further contains, as a component (E), a fluorine-containing organosilicon compound having, in one molecule, one or more perfluoroalkyl groups or perfluorooxyalkyl groups, and further having one or more alkoxy groups directly bonded to silicon atoms, and free of a hydrogen atom directly bonded to a silicon atom (a SiH group) in the molecule, in an amount of 0.01 to 300 parts by weight per 100 parts by weight of the component (A).

[9]

The thermally conductive sheet product according to any one of [1] to [8], wherein the thermally conductive fluorine-containing curable composition further contains, as a component (F), at least one non-functional polyfluoro compound selected from the group consisting of compounds having the following general formula (3) and the following general formula (4), in an amount of 0.1 to 300 parts by weight per 100 parts by weight of the component (A):

$$F—(CF_2CF_2CF_2O)_a—A \qquad (3)$$

wherein A is a group having $—C_bF_{2b+1}$ (b is an integer of 1 to 3) and a is an integer of 1 to 500, $$A—\{(OCF(CF_3)CF_2)_c—(OCF_2CF_2)_d—(OCF_2)_{u'}\}—O—A \qquad (4)$$

wherein A is the same as above, c and d are each an integer of 0 to 300, u' is an integer of 1 to 300, c and d are not 0 at the same time, and the repeating units may be randomly arranged.

[10]

The thermally conductive sheet product according to any one of [1] to [9], wherein the thermally conductive fluorine-containing curable composition further contains, as a component (G), a polyfluoromonoalkenyl compound having one alkenyl group in one molecule and having a perfluoropolyether structure in a main chain, in an amount of 0.1 to 100 parts by weight per 100 parts by weight of the component (A).

[11]

The thermally conductive sheet product according to any one of [1] to [10], wherein the alkenyl group content in the component (A) is 0.0050 to 0.300 mol/100 g.

[12]

The thermally conductive sheet product according to any one of [1] to [11], wherein the perfluoropolyether structure in the component (A) includes a structure having the following general formula (5):

$$—(C_mF_{2m}O)_n— \qquad (5)$$

wherein m is an integer of 1 to 6 and n is an integer of 1 to 300.

[13]

The thermally conductive sheet product according to any one of [1] to [12], wherein the component (A) is one or more linear polyfluoro compounds selected from the group consisting of the following general formula (6) and the following general formula (7):

[18]

The thermally conductive sheet product according to [16] or [17], wherein the spherical alumina as the component (D) has an average particle size of 5 to 100 μm. [19]

The thermally conductive sheet product according to any one of [8] to [18], wherein the component (E) is a fluorine-containing organosilicon compound having, in one molecule, one or more perfluoroalkyl groups or perfluorooxyalkyl groups bonded to a silicon atom directly bonded to an alkoxy group, via a divalent hydrocarbon group that may contain a carbon atom, a silicon atom, an oxygen atom, and a nitrogen atom.

[Chem. 2]

(6)

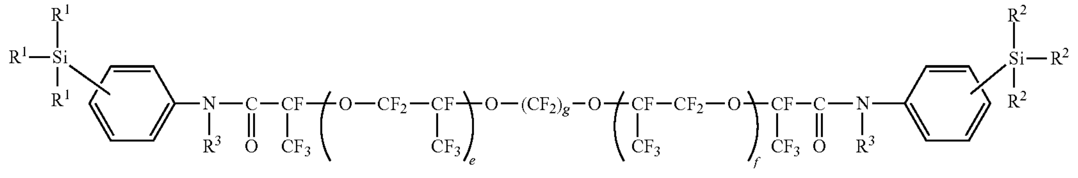

wherein $R^1$ and $R^2$ independently at each occurrence denote an alkenyl group or an unsubstituted or substituted monovalent hydrocarbon group free of an aliphatic unsaturated bond, 2 or more of all of $R^1$ and $R^2$ are alkenyl groups, $R^1$ independently at each occurrence denotes a hydrogen atom or an unsubstituted or substituted monovalent hydrocarbon group, e and f are each an integer of 1 to 150, the average value of e+f is 2 to 300, and g is an integer of 1 to 6,

[20]

The thermally conductive sheet product according to any one of [8] to [19], wherein the component (E) is a fluorine-containing organosilicon compound having the following general formula (8):

[Chem. 3]

(7)

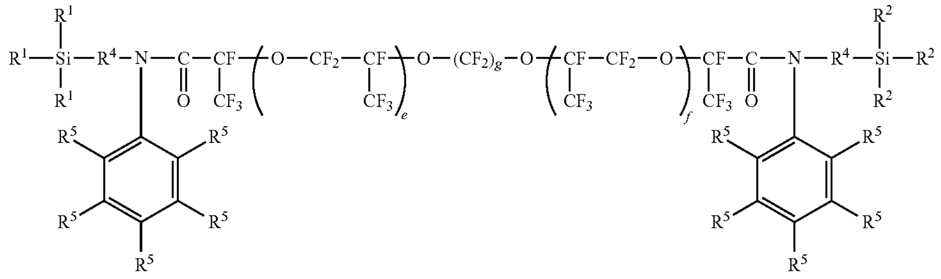

wherein $R^4$ independently at each occurrence denotes an alkylene group having 1 to 6 carbon atoms, $R^5$ independently at each occurrence denotes a hydrogen atom or an alkyl group having 1 to 4 carbon atoms that may be substituted with fluorine, and $R^1$, $R^2$, e, f, and g are the same as above.

[14]

The thermally conductive sheet product according to any one of [1] to [13], wherein the component (D) is at least one selected from metals, metal oxides, metal nitrides, metal hydroxides, metal carbides, soft magnetic alloys, and ferrites.

[15]

The thermally conductive sheet product according to [14], wherein the component (D) is alumina.

[16]

The thermally conductive sheet product according to [15], wherein the component (D) is amorphous alumina and/or spherical alumina.

[17]

The thermally conductive sheet product according to [16], wherein the amorphous alumina as the component (D) has an average particle size of 0.2 to 5 μm.

$$D_{g'}R^{14}_{h'}Si(OR^6)_{4-g'-h'} \quad (8)$$

wherein D independently at each occurrence denotes a perfluoroalkyl group or a perfluorooxyalkyl group bonded to a silicon atom directly bonded to an alkoxy group, via a divalent hydrocarbon group that may contain a carbon atom, a silicon atom, an oxygen atom, and a nitrogen atom, $R^6$ independently at each occurrence denotes an alkyl group having 1 to 6 carbon atoms, $R^{14}$ independently at each occurrence denotes an unsubstituted or substituted monovalent hydrocarbon group, g' is an integer of 1 to 3, h' is an integer of 0 to 2, and g'+h' is an integer of 1 to 3.

[21]

The thermally conductive sheet product according to any one of [10] to [20], wherein the component (G) is a polyfluoromonoalkenyl compound having the following general formula (9):

$$Rf—(Y)_h—CH═CH_2 \quad (9)$$

wherein Rf is a group having the following general formula (10):

$$F—[CF(CF_3)CF_2O]_i—C_jF_{2j}— \quad (10)$$

wherein i is an integer of 1 to 200 and j is an integer of 1 to 3,

Y is $—CH_2—$, $—OCH_2—$, $—CH_2OCH_2—$, or $—CO—NR^{15}—Z—$ wherein these groups are bonded to Rf at the left end and bonded to the carbon atom at the right end, $R^{15}$ is a hydrogen atom, a methyl group, a phenyl group, or an allyl group, and Z is $—CH_2—$, a group having the following structural formula (Z), or a group having the following structural formula (Z'):

[Chem. 4]

(Z)

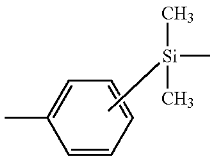

wherein the group is an o-, m-, or p-dimethylphenylsilylene group wherein the left end is bonded to the nitrogen atom and the right end is bonded to the carbon atom.

[Chem. 5]

(Z')

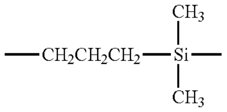

wherein the left end is bonded to the nitrogen atom and the right end is bonded to the carbon atom, and h is 0 or 1.

[22]

The thermally conductive sheet product according to any one of [1] to [21], wherein the cured product obtained by curing the thermally conductive fluorine-containing curable composition has a thermal conductivity at 25° C. of 1.0 W/m K or more.

[23]

The thermally conductive sheet product according to any one of [1] to [22], wherein the cured product obtained by curing the thermally conductive fluorine-containing curable composition has a hardness of 60 or less as measured with a type E durometer specified in JS K6253-3.

[24]

A method for producing the thermally conductive sheet product according to any one of [1] to [23], the method including a step of hot pressing a thermally conductive fluorine-containing curable composition sandwiched between electrically insulating films to cure the composition into a sheet form, the thermally conductive fluorine-containing curable composition containing:

(A) 100 parts by weight of a linear polyfluoro compound having two or more alkenyl groups in one molecule and having a perfluoropolyether structure in a main chain;

(B) a fluorine-containing organohydrogensiloxane having, in one molecule, one or more selected from perfluoroalkyl groups, perfluorooxyalkyl groups, perfluoroalkylene groups, and perfluorooxyalkylene groups, and further having two or more hydrogen atoms directly bonded to silicon atoms (SiH groups), and free of an alkoxy group directly bonded to a silicon atom in the molecule, in an amount such that the amount of hydrogen atoms directly bonded to silicon atoms in the component (B) is 0.50 to 3.0 mol per 1 mol of alkenyl groups contained in the whole of the composition;

(C) a platinum group metal-based catalyst in an amount of 0.1 to 2,000 ppm in terms of the weight of platinum group metal atoms with respect to the component (A); and (D) 100 to 4,000 parts by weight of a thermally conductive filler.

[25]

A method for producing the thermally conductive sheet product according to any one of [1] to [23], the method including a step of coating an electrically insulating film having a long length with a thermally conductive fluorine-containing curable composition, thermally curing the composition, and attaching another of the electrically insulating film onto the cured product, the thermally conductive fluorine-containing curable composition containing:

(A) 100 parts by weight of a linear polyfluoro compound having two or more alkenyl groups in one molecule and having a perfluoropolyether structure in a main chain;

(B) a fluorine-containing organohydrogensiloxane having, in one molecule, one or more selected from perfluoroalkyl groups, perfluorooxyalkyl groups, perfluoroalkylene groups, and perfluorooxyalkylene groups, and further having two or more hydrogen atoms directly bonded to silicon atoms (SiH groups), and free of an alkoxy group directly bonded to a silicon atom in the molecule, in an amount such that the amount of hydrogen atoms directly bonded to silicon atoms in the component (B) is 0.50 to 3.0 mol per 1 mol of alkenyl groups contained in the whole of the composition;

(C) a platinum group metal-based catalyst in an amount of 0.1 to 2,000 ppm in terms of the weight of platinum group metal atoms with respect to the component (A); and (D) 100 to 4,000 parts by weight of a thermally conductive filler.

Advantageous Effects of Invention

The thermally conductive sheet product of the present invention includes a thermally conductive sheet composed of a cured product obtained by curing a thermally conductive fluorine-containing curable composition having excellent oil resistance and thermal conductivity, both sides of the thermally conductive sheet being protected from foreign matter and the like, and can be produced directly by a press forming method or the like, and is interposable between a heat-generating member and a heat-dissipating member with excellent workability.

DESCRIPTION OF EMBODIMENTS

Figure 1:
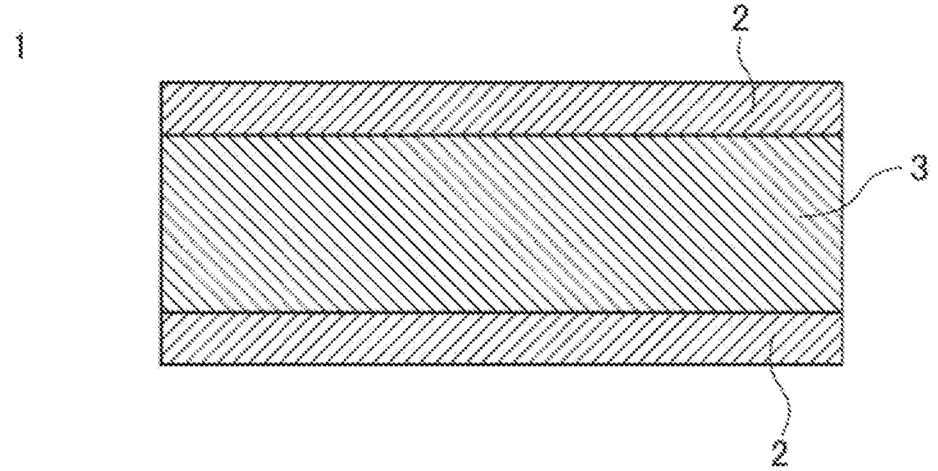
FIG. 1 is a sectional view of a thermally conductive sheet product according to an embodiment of the present invention in which electrically insulating films are attached on both sides of a thermally conductive sheet.
Figure 2:
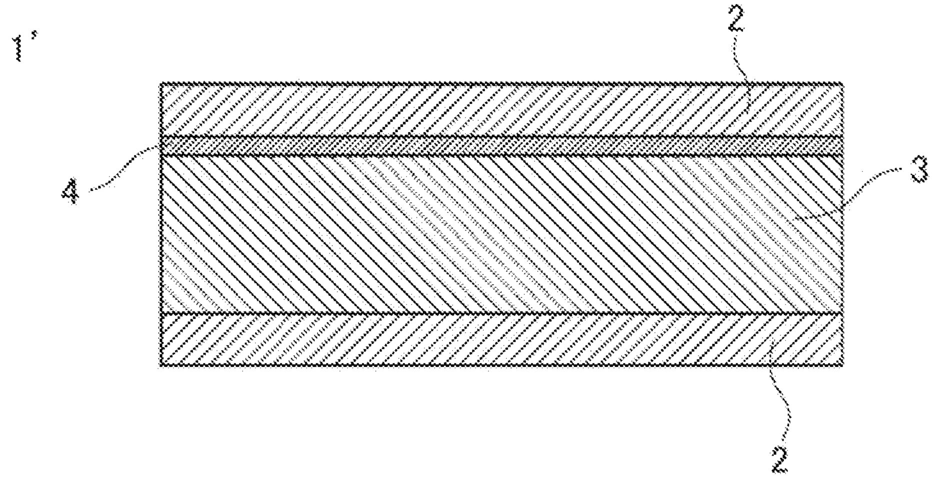
FIG. 2 is a sectional view of a thermally conductive sheet product according to another embodiment of the present invention in which an electrically insulating film is attached on one side of a thermally conductive sheet, and an electrically insulating film treated with a fluorine-containing silicone release agent is attached on the other side.
Figure 3:
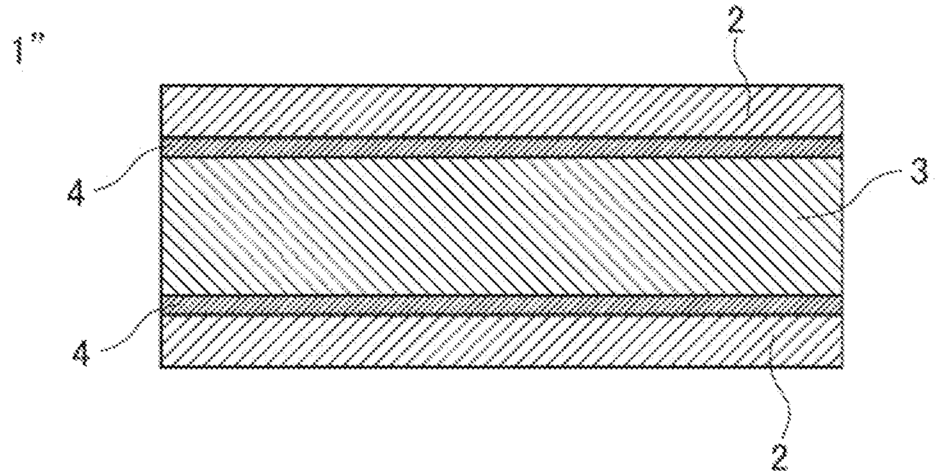
FIG. 3 is a sectional view of a thermally conductive sheet product according to a still another embodiment of the present invention in which electrically insulating films treated with a fluorine-containing silicone release agent are attached on both sides of a thermally conductive sheet.

As illustrated in FIGS. 1 to 3, a thermally conductive sheet product of the present invention has a configuration in which electrically insulating films are attached on both sides of a thermally conductive sheet composed of a cured product obtained by curing a thermally conductive fluorine-containing curable composition having excellent oil resistance and thermal conductivity.

Hereinafter, the present invention is described in detail.

[Thermally Conductive Sheet Product]

In a thermally conductive sheet product of the present invention, electrically insulating films are attached on both sides of a thermally conductive sheet composed of a cured product obtained by curing a thermally conductive fluorine-containing curable composition containing components (A) to (D) described later.

[Electrically Insulating Films]

The thickness of the electrically insulating films may vary in a wide range depending on, for example, the hardness and the surface adhesiveness of the thermally conductive sheet, but it is usually preferable that the thickness be 1 to 200 μm. When the thickness of the electrically insulating films is 1 μm or more, there is no decrease in handling workability stemming from the softness of the electrically insulating films, and the electrically insulating films can be peeled from the thermally conductive sheet without a possibility that the thermally conductive sheet is broken and residues remain after the peeling. When, on the other hand, the thickness of the electrically insulating films is 200 μm or less, there is no decrease in handling workability due to the lack of flexibility of the films, and there is no possibility that the adhesion to the surface of the thermally conductive sheet is lowered.

The substrate of the electrically insulating films is not particularly limited as long as the substrate has electrical insulating properties, and known substrates may be used. For example, plastic films include polyolefins, such as polyethylene (PE) and polypropylene (PP), polyimides (PI), polyamides (PA), polyesters, such as polyethylene terephthalate (PET) and polyethylene naphthalate (PEN), aromatic polyether ketones, such as polyether ether ketone, fluorine-containing polymers, such as polytetrafluoroethylene and tetrafluoroethylene/perfluoroalkyl vinyl ether copolymers, and polyvinyl chlorides, and naturally occurring substrates include paper. Among those described above, polyethylene terephthalate (PET) is particularly preferable from the points of view of flexibility and mechanical strength. Where necessary, the films used in the present invention may be stacks of two or more of the above substrates.

In the electrically insulating films, it is preferable that at least one electrically insulating film be treated with a fluorine-containing silicone release agent on the side to be in contact with the thermally conductive sheet. The treatment with such a release agent allows the film to be easily peeled from the thermally conductive sheet.

From the point of view of the releasability from the thermally conductive sheet, the fluorine-containing silicone release agent is preferably one that contains an organopolysiloxane having one or more perfluoroalkyl groups or perfluorooxyalkyl groups (such as, for example, an organopolysiloxane having one or more perfluoroalkyl groups or perfluorooxyalkyl groups, or a solution of the organopolysiloxane having one or more perfluoroalkyl groups or perfluorooxyalkyl groups in a solvent).

Examples of the perfluoroalkyl groups or the perfluorooxyalkyl groups include groups having the following general formula (1) or (2):

$$C_{f''}F_{2f''+1}— \quad (1)$$

wherein f'' is an integer of 1 to 10,

[Chem. 6]

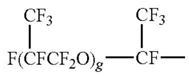

(2)

wherein g'' is an integer of 1 to 30.

The perfluoroalkyl group or the perfluorooxyalkyl group and a silicon atom constituting the organopolysiloxane are preferably connected via a divalent linking group. The divalent linking group is preferably an unsubstituted or substituted divalent hydrocarbon group having 2 to 12 carbon atoms, in particular 2 to 8 carbon atoms, that may have an oxygen atom, a nitrogen atom, or a silicon atom. Specific examples include alkylene groups, arylene groups, and combinations thereof. The groups mentioned above may be interrupted with, for example, one or more structures selected from the group consisting of ether-bonding oxygen atoms, amide bonds, carbonyl bonds, ester bonds, and diorganosilylene groups, such as dimethylsilylene groups. For example, those having 2 to 13 carbon atoms can be mentioned, such as:

$—CH_2CH_2—$, $—CH_2CH_2CH_2—$, $—CH_2CH_2CH_2OCH_2—$, $—CH_2CH_2CH_2—NH—CO—$, $—CH_2CH_2CH_2—N(Ph)\text{-}CO—$, $—CH_2CH_2CH_2—N(CH_3)—CO—$, $—CH_2CH_2CH_2—N(CH_2CH_3)—CO—$, $—CH_2CH_2CH_2—N(CH(CH_3)_2)—CO—$, $—CH_2CH_2CH_2—O—CO—$, $—CH_2CH_2—Si(CH_3)_2\text{-}Ph'—N(CH_3)—CO—$, and $—CH_2CH_2CH_2—Si(CH_3)_2\text{-}Ph'—N(CH_3)—CO—$ wherein Ph is a phenyl group and Ph' is a phenylene group. In the above structures, preferably, the left end is bonded to the silicon atom and the right end is bonded to the perfluoroalkyl group or the perfluorooxyalkyl group.

In the organopolysiloxane, the monovalent substituents bonded to silicon atoms, other than the perfluoroalkyl groups or the perfluorooxyalkyl groups, are unsubstituted or substituted alkyl groups or aryl groups having 1 to 20, preferably 1 to 12 carbon atoms. Examples thereof include alkyl groups, such as a methyl group, an ethyl group, a propyl group, a butyl group, a hexyl group, a cyclohexyl group, an octyl group, and a decyl group; aryl groups, such as a phenyl group, a tolyl group, and a naphthyl group; and groups resulting from substitution of the above groups by a halogen atom, such as a chlorine atom, a cyano group, or the like in place of some or all of the hydrogen atoms, such as a chloromethyl group, a chloropropyl group, a cyanoethyl group, and the like. Among those described above, a methyl group is preferable.

The polysiloxane structure that constitutes the organopolysiloxane may be any of a cyclic structure, a chain structure, a three-dimensional network structure, and a combination thereof. The number of silicon atoms in the organopolysiloxane is not particularly limited, but is usually 9 to 800, preferably 20 to 600, and more preferably 50 to 400.

Examples of the organopolysiloxanes having one or more perfluoroalkyl groups or perfluorooxyalkyl groups include, for example, organopolysiloxanes (addition reaction products) obtained by a hydrosilylation addition reaction in which addition and crosslinking are performed between a fluorine-containing organopolysiloxane of the following general formula (1) that has an alkenyl group in the molecule and a fluorine-containing organohydrogenpolysiloxane of the following general formula (II) that has a hydrogen atom bonded to a silicon atom (a SiH group) in the molecule.

[Chem. 7]

(I)

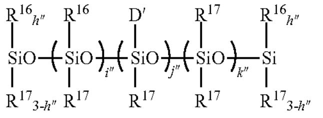

wherein D' independently at each occurrence denotes the perfluoroalkyl group or the perfluorooxyalkyl group that is bonded to the silicon atom constituting the organopolysiloxane via the divalent hydrocarbon group that may contain an oxygen atom, a nitrogen atom, and a silicon atom, $R^{16}$ independently at each occurrence denotes an alkenyl group having 2 to 20, preferably 2 to 10 carbon atoms, with specific examples including a vinyl group, an allyl group, a hexenyl group, and the like, $R^{17}$ independently at each occurrence denotes an unsubstituted or substituted monovalent hydrocarbon group having 1 to 10 carbon atoms and having no aliphatic unsaturated bonds, with specific examples including alkyl groups, such as a methyl group, an ethyl group, and a propyl group, cycloalkyl groups, such as a cyclohexyl group, aryl groups, such as a phenyl group and a tolyl group, and groups resulting from substitution of the above groups by a hydroxyl group, a cyano group, or the like in place of some or all of the hydrogen atoms, such as a hydroxypropyl group, a cyanoethyl group, and the like, h" is 1, 2, or 3, i" is an integer of 0 or more, j" is an integer of 1 or more, k" is an integer of 0 or more, and i"+j"+k" is an integer of 1 to 700. The repeating units may be randomly arranged.

[Chem. 8]

(II)

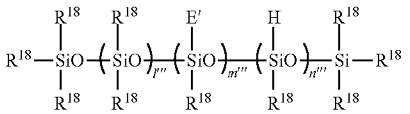

wherein E' independently at each occurrence is the same as D' above, $R^{18}$ independently at each occurrence is the same as $R^{17}$ above, l''', is an integer of 0 or more, m''' is an integer of 1 or more, n''' is an integer of 3 or more, and l'''+m'''+n''' is an integer of 4 to 400. The repeating units may be randomly arranged.

For purposes, such as workability in coating the film and coating weight control, the organopolysiloxane may be diluted with an appropriate solvent, for example, a hydrocarbon organic solvent, such as toluene, acetone, or methyl ethyl ketone, or a fluorinated solvent, such as a hydrofluoroether, a chlorofluorocarbon, xylene hexafluoride, a perfluoroalkane, benzotrifluoride, 1,3-bis(trifluoromethyl)benzene, Fluorinert (manufactured by 3M), perfluorobutyl methyl ether, or perfluorobutyl ethyl ether.

A commercially available product may be used as the fluorine-containing silicone release agent. Specific examples of commercially available products include, for example, X-70-201S, X-70-220S, X-70-258, and X-70-411 (all manufactured by Shin-Etsu Chemical Co., Ltd.).

For example, the side of the electrically insulating film that will be brought into contact with the thermally conductive sheet is preferably treated with the fluorine-containing silicone release agent in such a manner that the release agent is thinly applied by a technique, such as gravure coating or reverse gravure coating, onto the side of the electrically insulating film that will be brought into contact with the thermally conductive sheet, and is cured and fixed.

[Thermally Conductive Sheet]

The thermally conductive sheet used in the present invention is composed of a cured product of a thermally conductive fluorine-containing curable composition that contains components (A) to (D) described later and, where necessary, components (E) to (G), and the like described later.

[Component (A)]

The component (A) is a linear polyfluoro compound having two or more alkenyl groups in one molecule and a perfluoropolyether structure in a main chain.

The alkenyl groups contained in the component (A) are preferably those that have 2 to 8 carbon atoms, in particular 2 to 6 carbon atoms, and have a $CH_2{=}CH-$ structure at a terminal, with examples including a vinyl group, an allyl group, a propenyl group, an isopropenyl group, a butenyl group, a hexenyl group, and the like. In particular, a vinyl group and an allyl group are particularly preferable.

The alkenyl group content in the linear polyfluoro compound as the component (A) is preferably 0.0050 to 0.300 mol/100 g, and more preferably 0.0070 to 0.200 mol/100 g. When the alkenyl group content is 0.0050 mol/100 g or more, the degree of crosslinking becomes sufficient, and there is no possibility that curing defects occur. When, on the other hand, the alkenyl group content is 0.300 mol/100 g or less, there is no possibility that the mechanical properties of a cured product obtained by curing the thermally conductive fluorine-containing curable composition are impaired. The alkenyl group content may be measured by proton nuclear magnetic resonance spectroscopy ($^1H$-NMR) using an internal standard substance, infrared spectroscopy (IR) using a calibration curve, or the like.

The perfluoropolyether structure of the component (A) contains a large number of repeating units:

$$-C_mF_{2m}O-$$

wherein m is an integer of 1 to 6, and examples thereof include those having the following general formula (5):

$$-(C_mF_{2m}O)_n- \quad (5)$$

wherein m is an integer of 1 to 6, and n is an integer of 1 to 300, preferably an integer of 1 to 200.

Examples of the repeating units $-C_mF_{2m}O-$ include, for example, units of the following formulas:

$-CF_2O-$, $-CF_2CF_2O-$, $-CF_2CF_2CF_2O-$, $-CF_2(CF_3)CF_2O-$, $-CF_2CF_2CF_2CF_2O-$, $-CF_2CF_2CF_2CF_2CF_2CF_2O-$, and $-C(CF_3)_2O-$.

Among those described above, in particular, the repeating units of the following formulas:

$-CF_2O-$, $-CF_2CF_2O-$, $-CF_2CF_2CF_2O-$, and $-CF_2(CF_3)CF_2O-$ are preferred.

The perfluoropolyether structure of the component (A) may be composed of one of the above repeating units, or may be composed of a combination of two or more thereof.

Preferred examples of the component (A) include linear polyfluoro compounds having the following general formula (6) and the following general formula (7):

[Chem. 9]

(6)

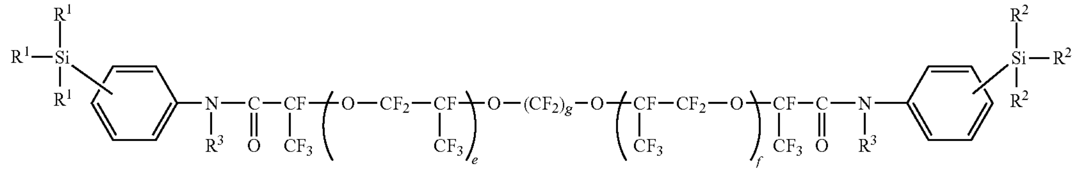

wherein $R^1$ and $R^2$ independently at each occurrence denote an alkenyl group or an unsubstituted or substituted monovalent hydrocarbon group free of an aliphatic unsaturated bond, 2 or more of all of $R^1$ and $R^2$ are alkenyl groups, $R^3$ independently at each occurrence denotes a hydrogen atom or an unsubstituted or substituted monovalent hydrocarbon group, e and f are each an integer of 1 to 150, the average value of e+f is 2 to 300, and g is an integer of 1 to 6.

[Chem. 10]

(7)

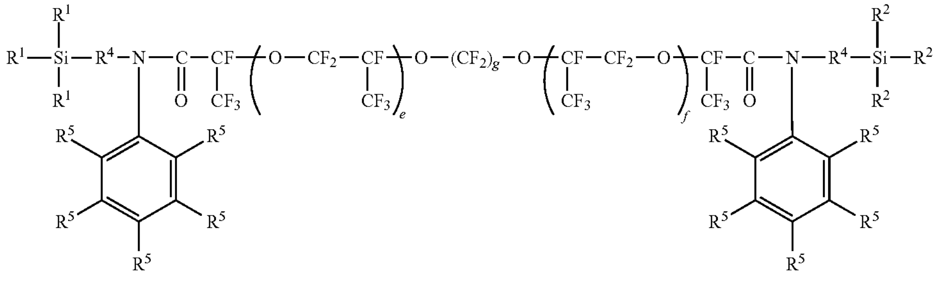

wherein $R^4$ independently at each occurrence denotes an alkylene group having 1 to 6 carbon atoms, $R^5$ independently at each occurrence denotes a hydrogen atom or an alkyl group having 1 to 4 carbon atoms that may be substituted with fluorine, and $R^1$, $R^2$, e, f, and g are the same as above.

Here, the alkenyl groups contained as $R^1$ and $R^2$ are the same as described hereinabove. The other groups, that is, the unsubstituted or substituted monovalent hydrocarbon groups free of an aliphatic unsaturated bond, are preferably those having 1 to 12 carbon atoms, particularly preferably those having 1 to 10 carbon atoms, with specific examples including alkyl groups, such as a methyl group, an ethyl group, a propyl group, a butyl group, a hexyl group, a cyclohexyl group, and an octyl group; aryl groups, such as a phenyl group and a tolyl group; aralkyl groups, such as a benzyl group and a phenylethyl group; monovalent hydrocarbon groups in which some or all of the hydrogen atoms in the above groups are substituted with halogen atoms, such as fluorine atoms; and the like. Among those described above, a vinyl group, an allyl group, a methyl group, and an ethyl group are particularly preferable as $R^1$ and $R^2$.

Examples of the unsubstituted or substituted monovalent hydrocarbon group contained as $R^3$ include the same groups as those described above as the unsubstituted or substituted monovalent hydrocarbon groups free of an aliphatic unsaturated bond for $R^1$ and $R^2$. $R^3$ is preferably a hydrogen atom, a methyl group, or an ethyl group.

$R^4$ independently at each occurrence denotes an alkylene group having 1 to 6 carbon atoms, preferably 2 to 6 carbon atoms. Specific examples thereof include a methylene group, an ethylene group, a propylene group (trimethylene group, methylethylene group), a butylene group (tetramethylene group, methylpropylene group), a hexamethylene group, and the like, and an ethylene group and a propylene group are particularly preferable.

$R^5$ independently at each occurrence denotes a hydrogen atom or an alkyl group having 1 to 4 carbon atoms that may be substituted with fluorine. Specific examples of the alkyl group having 1 to 4 carbon atoms that may be substituted with fluorine include alkyl groups, such as a methyl group, an ethyl group, a propyl group, and a butyl group, and groups in which some or all of the hydrogen atoms in these groups are substituted with fluorine atoms, for example, a trifluoromethyl group, and the like. As $R^5$, a hydrogen atom is preferable.

Each of e and f is preferably an integer of 1 to 150, more preferably an integer of 1 to 100, and the average value of e+f is preferably 2 to 300, more preferably 2 to 200. Furthermore, g is preferably an integer of 1 to 6, more preferably an integer of 1 to 4.

Specific examples of the linear polyfluoro compound having the general formula (6) include those having the following formulas:

[Chem. 11]

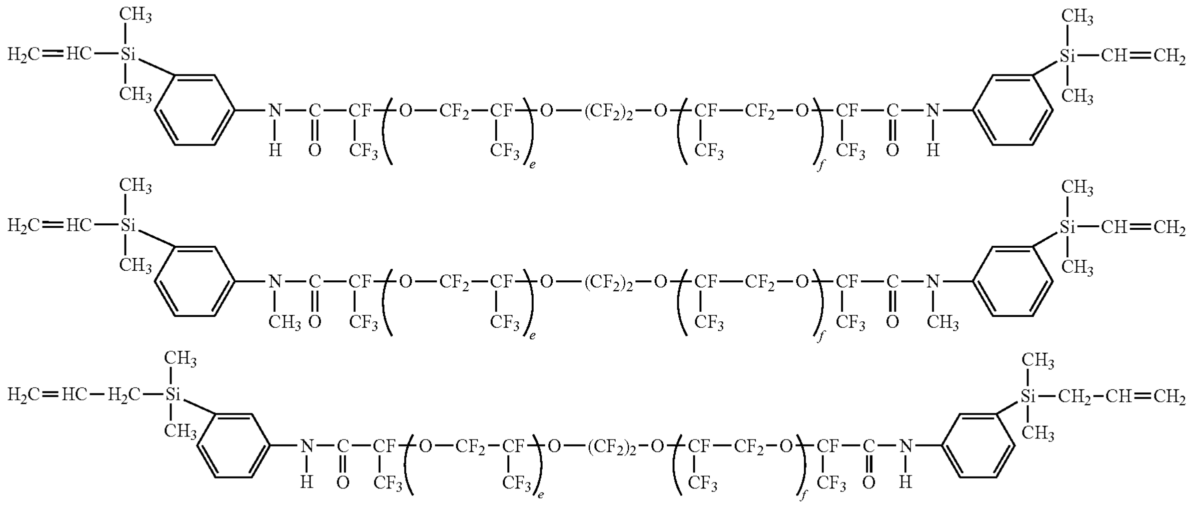

wherein e and f are each an integer of 1 to 150.

[Chem. 12]

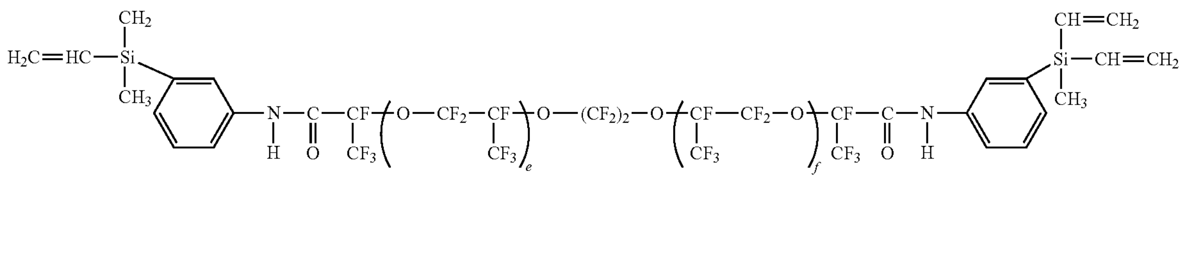

-continued
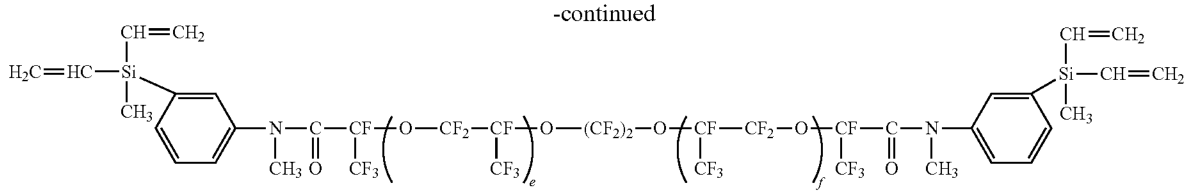
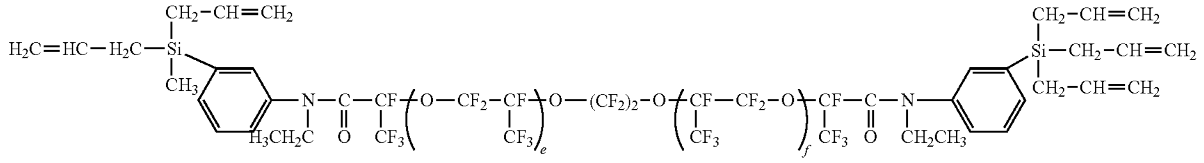
wherein e and f are each an integer of 1 to 150.
[Chem. 13]
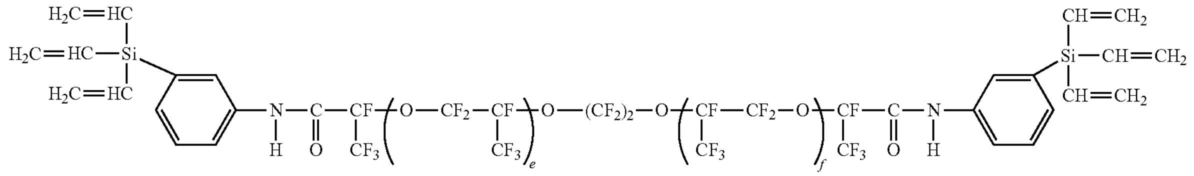
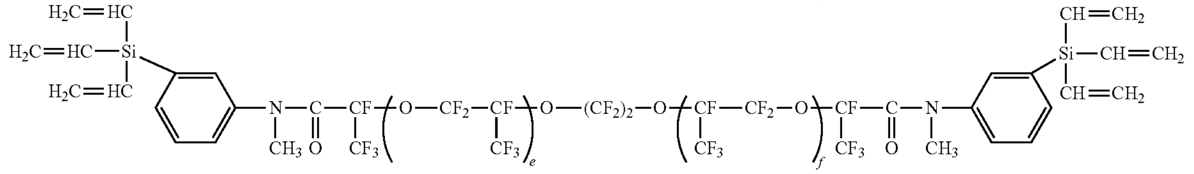
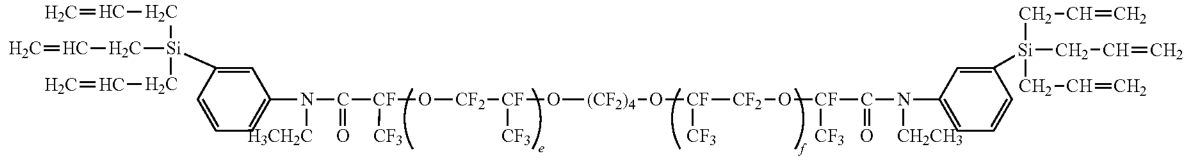
wherein e and f are each an integer of 1 to 150.
Specific examples of the linear polyfluoro compound having the general formula (7) include those having the following formulas:
[Chem. 14]
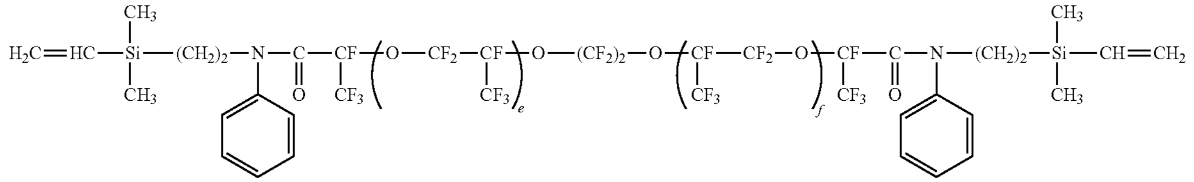
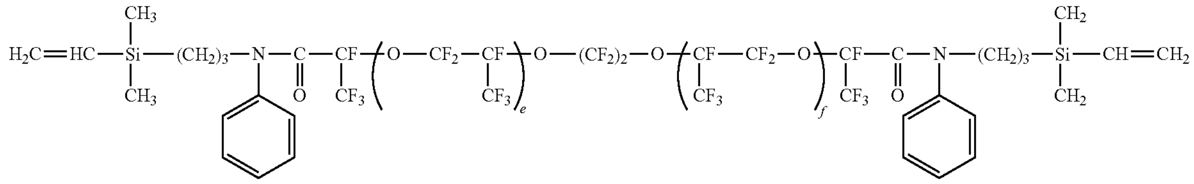

-continued

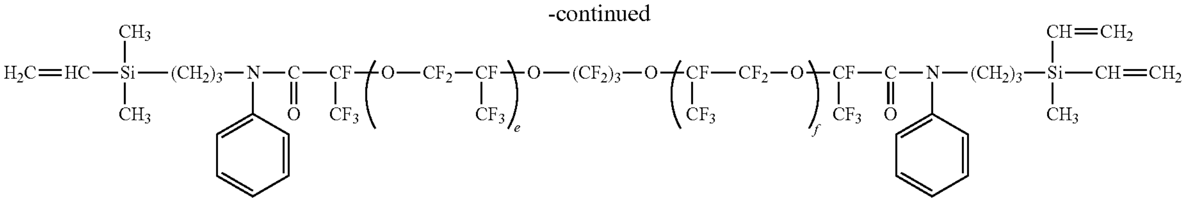

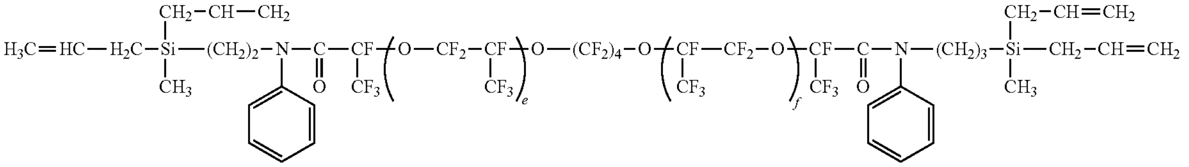

wherein e and f are each an integer of 1 to 100.

[Chem. 15]

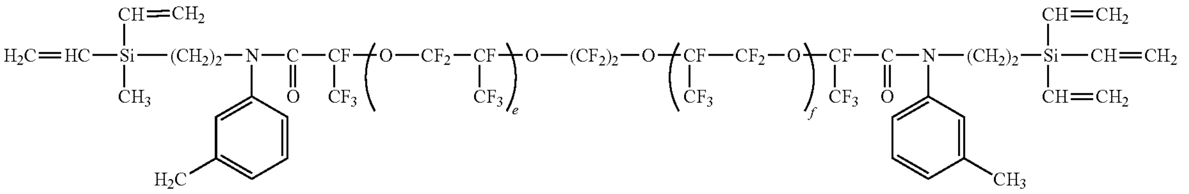

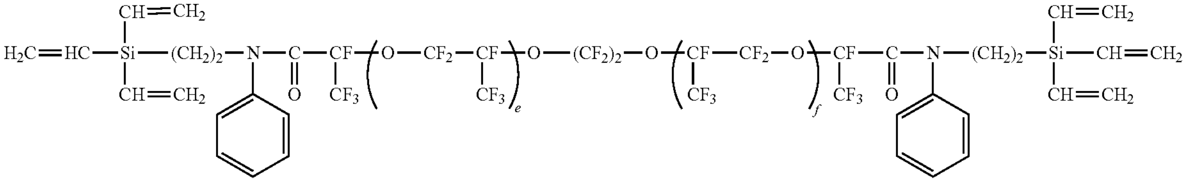

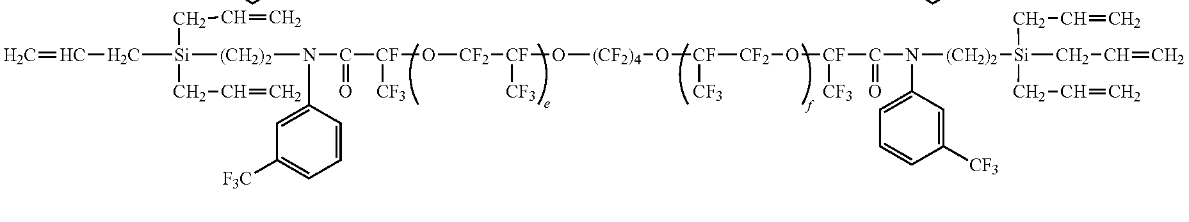

wherein e and f are each an integer of 1 to 100.

In the present invention, the viscosity can be measured with a rotational viscometer (for example, BL type, BH type, BS type, cone plate type, rheometer, or the like). In particular, the viscosity (23° C.) of the linear polyfluoro compound having the general formula (6) or (7) is preferably in the range of 500 to 100,000 mPa-s, more preferably 1,000 to 50,000 mPa s in the viscosity measurement specified in JS K7117-1. When the viscosity is 500 mPa-s or more, there is no possibility that the storage stability of the resulting composition is deteriorated. When the viscosity is 100,000 mPa-s or less, there is no possibility that the extensibility of the resulting composition is deteriorated.

Further, the polymerization degree (or the molecular weight) of the linear polyfluoro compound reflecting, for example, the number of repetitions of the perfluorooxyalkylene units constituting the perfluoropolyether structure of the main chain may be determined as, for example, the numerical average polymerization degree (or the numerical average molecular weight) in terms of polystyrene by gel permeation chromatography (GPC) analysis using a fluorinated solvent as a developing solvent.

The linear polyfluoro compounds can be used singly or in combination of two or more kinds thereof. That is, among the linear polyfluoro compounds having the general formula (6) or (7), one kind can be used singly or two or more kinds can be used in combination, and the linear polyfluoro compounds having the general formulas (6) and (7) can also be used in combination.

[Component (B)]

The component (B) is a fluorine-containing organohydrogensiloxane having, in one molecule, one or more selected from perfluoroalkyl groups, perfluorooxyalkyl groups, perfluoroalkylene groups, and perfluorooxyalkylene groups, and further having two or more hydrogen atoms directly bonded to silicon atoms (SiH groups or hydrosilyl groups), and free of an alkoxy group directly bonded to a silicon atom in the molecule, and is preferably a fluorine-containing organohydrogensiloxane having, in one molecule, one or more of the monovalent or divalent fluorine-containing organic groups described above and two or more hydrogen atoms directly bonded to silicon atoms, and free of additional functional groups other than SiH groups, such as epoxy groups, alkoxy groups, and cyclic carboxylic anhydride residues. This component functions as a crosslinking agent for the component (A). Here, the "additional functional groups" exclude, for example, divalent polar groups (polar structures), such as an ether-bonding oxygen atom, an amide bond, a carbonyl bond, and an ester bond, that may be contained in a divalent linking group which links the perfluoroalkyl group, the perfluorooxyalkyl group, the perfluoroalkylene group, or the perfluorooxyalkylene group to a silicon atom constituting the polysiloxane.

The perfluoroalkyl group, the perfluorooxyalkyl group, the perfluoroalkylene group, and the perfluorooxyalkylene group are groups introduced from the points of view of the compatibility with the component (A), dispersibility, uniformity after curing, and the like.

Examples of the perfluoroalkyl group or the perfluorooxyalkyl group include groups having the following general formula (11) or (12):

$$C_kF_{2k+1}— \qquad (11)$$

wherein k is an integer of 1 to 10, preferably an integer of 3 to 7.

[Chem. 16]

(12)

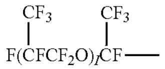

wherein l is an integer of 1 to 50, preferably an integer of 2 to 30.

Examples of the perfluoroalkylene group or the perfluorooxyalkylene group include groups having the following general formulas (13) to (15):

$$—C_pF_{2p}— \qquad (13)$$

wherein p is an integer of 1 to 20, preferably an integer of 2 to 10.

[Chem. 17]

(14)

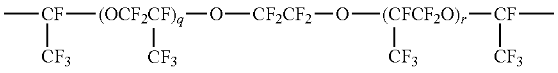

wherein q and r are each an integer of 1 or more, preferably an integer of 1 to 100, and the average of the sum of q and r is 2 to 200, preferably 2 to 100.

$$—CF_2O—(CF_2CF_2O)_s(CF_2O)_t—CF_2— \qquad (15)$$

wherein s and t are each an integer of 1 to 50, preferably an integer of 1 to 30, and the repeating units may be randomly arranged.

Furthermore, it is preferable that the perfluoroalkyl group, the perfluorooxyalkyl group, the perfluoroalkylene group, or the perfluorooxyalkylene group be connected to a silicon atom constituting the polysiloxane via a divalent linking group. The divalent linking group is preferably an unsubstituted or substituted divalent hydrocarbon group having 2 to 12 carbon atoms, in particular 2 to 8 carbon atoms, that may have an oxygen atom, a nitrogen atom, or a silicon atom. Specific examples include alkylene groups, arylene groups, and combinations thereof. The groups mentioned above may be interrupted with, for example, one or more structures selected from the group consisting of ether-bonding oxygen atoms, amide bonds, carbonyl bonds, ester bonds, and diorganosilylene groups, such as dimethylsilylene groups. For example, those having 2 to 13 carbon atoms can be mentioned, such as:

$—CH_2CH_2—$, $—CH_2CH_2CH_2—$, $—CH_2CH_2CH_2OCH_2—$, $—CH_2CH_2CH_2—NH—CO—$, $—CH_2CH_2CH_2—N(Ph)\text{-}CO—$, $—CH_2CH_2CH_2—N(CH_3)—CO—$, $—CH_2CH_2CH_2—N(CH_2CH_3)—CO—$, $—CH_2CH_2CH_2—N(CH(CH_3)_2)—CO—$, $—CH_2CH_2CH_2—O—CO—$, $—CH_2CH_2—Si(CH_3)_2\text{-}Ph'—N(CH_3)—CO—$, and $—CH_2CH_2CH_2—Si(CH_3)_2\text{-}Ph'—N(CH_3)—CO—$ wherein Ph is a phenyl group and Ph' is a phenylene group. In the above structures, preferably, the left end is bonded to the silicon atom and the right end is bonded to the perfluoroalkyl group, the perfluorooxyalkyl group, the perfluoroalkylene group, or the perfluorooxyalkylene group. A single kind or a combination of two or more kinds of these linking groups may be used in one molecule.

In the fluorine-containing organohydrogensiloxane as the component (B), the monovalent substituents bonded to silicon atoms, other than the monovalent or divalent fluorine-containing organic groups and the hydrogen atoms directly bonded to silicon atoms, are unsubstituted or substituted alkyl groups or aryl groups having 1 to 20, preferably 1 to 12 carbon atoms. Examples thereof include alkyl groups, such as a methyl group, an ethyl group, a propyl group, a butyl group, a hexyl group, a cyclohexyl group, an octyl group, and a decyl group; aryl groups, such as a phenyl group, a tolyl group, and a naphthyl group; and groups resulting from substitution of the above groups by a halogen atom, such as a chlorine atom, a cyano group, or the like in place of some or all of the hydrogen atoms, such as a chloromethyl group, a chloropropyl group, a cyanoethyl group, and the like. Among those described above, a methyl group is preferable.

The polysiloxane structure constituting the fluorine-containing organohydrogensiloxane as the component (B) may be any of a cyclic structure, a chain structure, a three-dimensional network structure, and a combination thereof. The number of silicon atoms in the fluorine-containing organohydrogensiloxane is not particularly limited, but is usually about 2 to 60, preferably about 3 to 30, and more preferably about 4 to 30.

Moreover, the component (B) has 2 or more SiH groups in one molecule, and the SiH group content is preferably 0.0100 to 1.00 mol/100 g, and more preferably 0.0200 to 0.900 mol/100 g. The SiH group content may be measured by proton nuclear magnetic resonance spectroscopy ($^1H$-NMR) using an internal standard substance, quantitative determination of hydrogen gas generated by cracking with a base, or the like.

Examples of the component (B) include those having the following general formulas (16) to (22):

[Chem. 18]

(16)

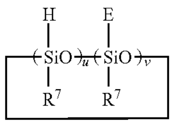

wherein E independently at each occurrence denotes the perfluoroalkyl group or the perfluorooxyalkyl group bonded to the silicon atom constituting the polysiloxane via the divalent hydrocarbon group that may contain an oxygen atom, a nitrogen atom, and a silicon atom, $R^7$ independently at each occurrence denotes the unsubstituted or substituted alkyl group or aryl group having 1 to 20, preferably 1 to 12 carbon atoms, u is an integer of 2 to 6, preferably an integer of 3 to 6, v is an integer of 1 to 4, preferably an integer of 1 to 3, and u+v is an integer of 4 to 10, preferably an integer of 4 to 9. The repeating units may be randomly arranged.

[Chem. 19]

(17)

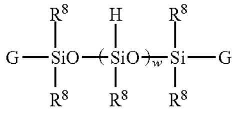

wherein G independently at each occurrence is the same as E above, $R^8$ independently at each occurrence is the same as $R^7$ above, and w is an integer of 2 to 50, preferably an integer of 3 to 30.

[Chem. 20]

(18)

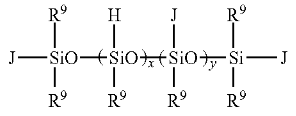

wherein J independently at each occurrence is the same as E above, $R^9$ independently at each occurrence is the same as $R^7$ above, x is an integer of 2 to 50, preferably an integer of 3 to 30, y is an integer of 1 to 40, preferably an integer of 1 to 20, and x+y is an integer of 4 to 60, preferably an integer of 4 to 50. The repeating units may be randomly arranged.

[Chem. 21]

(19)

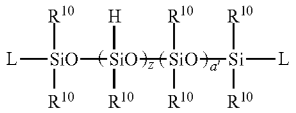

wherein L independently at each occurrence is the same as E above, $R^{10}$ independently at each occurrence is the same as $R^7$ above, z is an integer of 2 to 50, preferably an integer of 3 to 30, a' is an integer of 1 to 40, preferably an integer of 1 to 20, and z+a' is an integer of 4 to 60, preferably an integer of 4 to 50. The repeating units may be randomly arranged.

[Chem. 22]

(20)

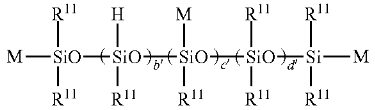

wherein M independently at each occurrence is the same as E above, $R^{11}$ independently at each occurrence is the same as $R^7$ above, b' is an integer of 2 to 50, preferably an integer of 3 to 30, c' is an integer of 1 to 40, preferably an integer of 1 to 20, d' is an integer of 1 to 40, preferably an integer of 1 to 20, and b'+c'+d' is an integer of 5 to 60, preferably an integer of 5 to 50. The repeating units may be randomly arranged.

[Chem. 23]

(21)

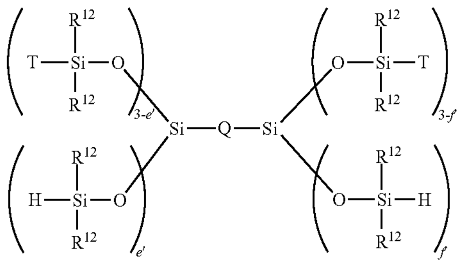

wherein Q is a perfluoroalkylene group or a perfluorooxyalkylene group bonded to the silicon atoms via an oxygen atom, an alkylene group, or a divalent hydrocarbon group that may contain an oxygen atom or a nitrogen atom, and examples of the perfluoroalkylene group or the perfluorooxyalkylene group include, for example, groups having the general formulas (13) to (15). Furthermore, T independently at each occurrence is the same as E above, $R^{12}$ independently at each occurrence is the same as $R^7$ above, e' is an integer of 0 to 3, f' is an integer of 0 to 3, and e'+f' is an integer of 2 to 6, preferably an integer of 3 to 5. When e'+f' is 6. Q is a perfluoroalkylene group or a perfluorooxyalkylene group bonded to the silicon atoms via a divalent hydrocarbon group that may contain an oxygen atom or a nitrogen atom.

[Chem. 24]

(22)

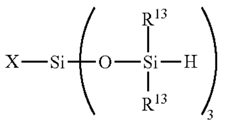

wherein X is the same as E above, and $R^{13}$ independently at each occurrence is the same as $R^7$ above.

Specific examples of the component (B) include the following compounds. These compounds may be used singly or in combination of two or more thereof. In the following formulas. Me represents a methyl group, and Ph represents a phenyl group.

[Chem. 25]
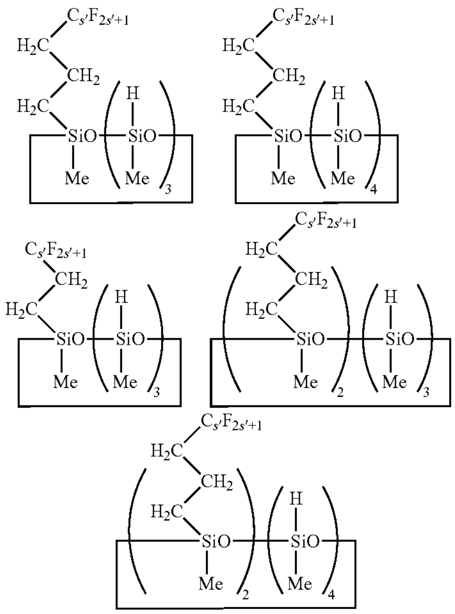
wherein s' is an integer of 1 to 10. The repeating units may be randomly arranged.
[Chem. 26]
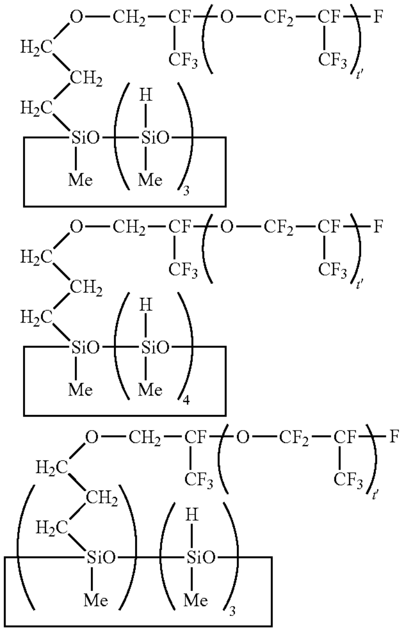
-continued
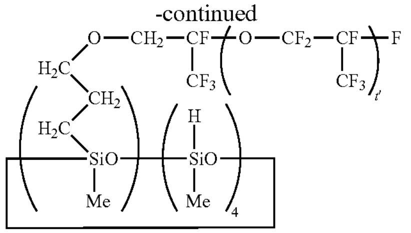
wherein t' is an integer of 1 to 50. The repeating units may be randomly arranged.
[Chem. 27]
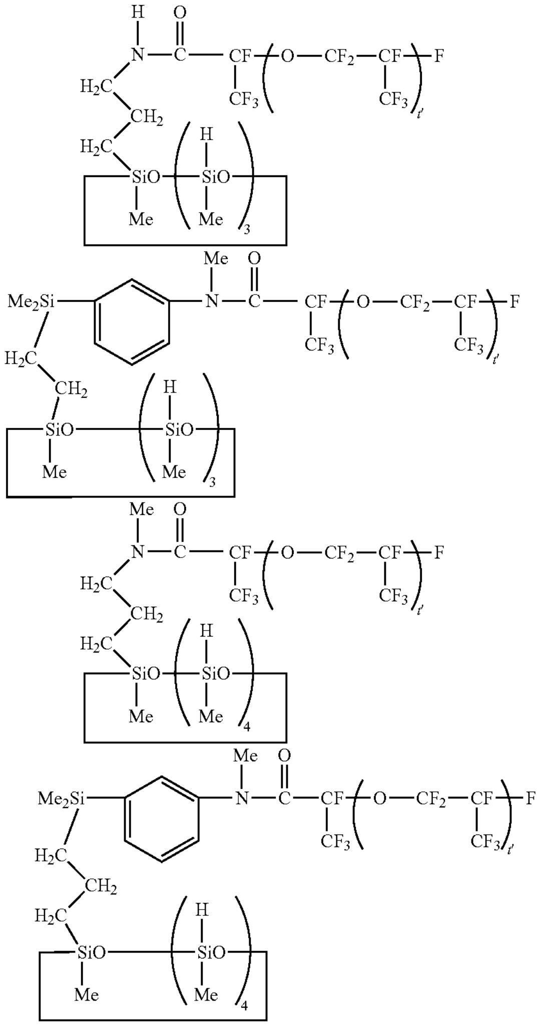
wherein t' is an integer of 1 to 50.
[Chem. 28]
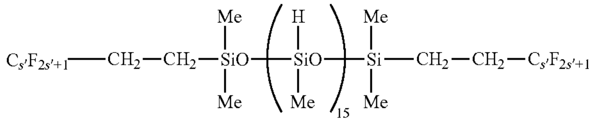

-continued
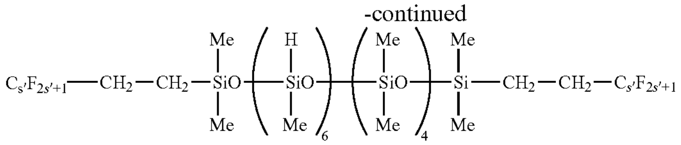
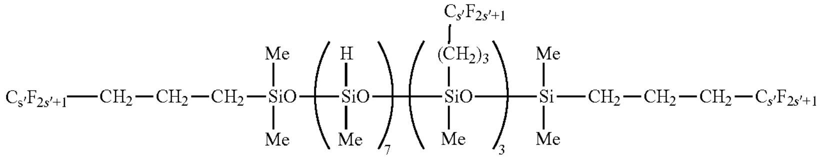
wherein s' is an integer of 1 to 10. The repeating units may be randomly arranged.
[Chem. 29]
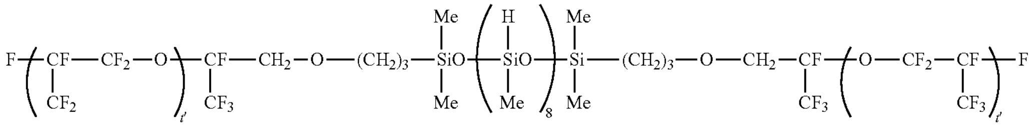
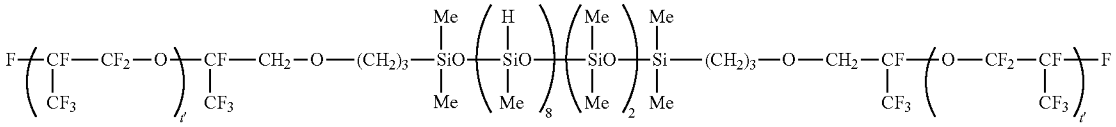
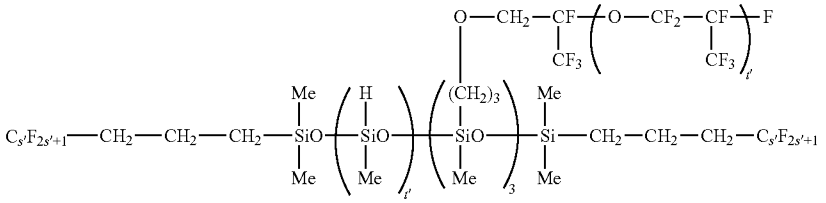
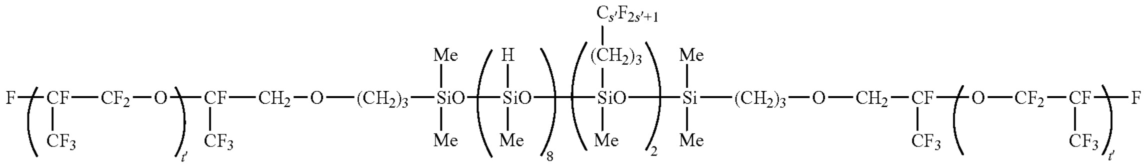
wherein s' is an integer of 1 to 10 and t' is an integer of 1 to 50. The repeating units may be randomly arranged.
[Chem. 30]
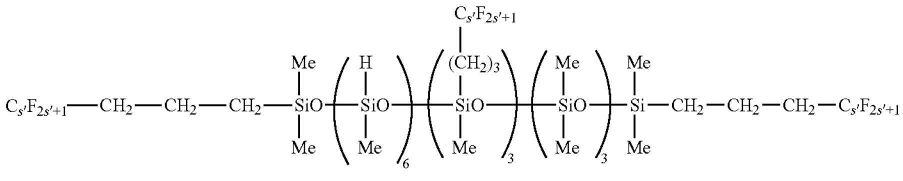
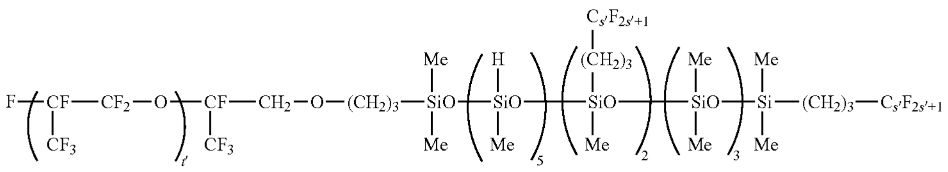

-continued
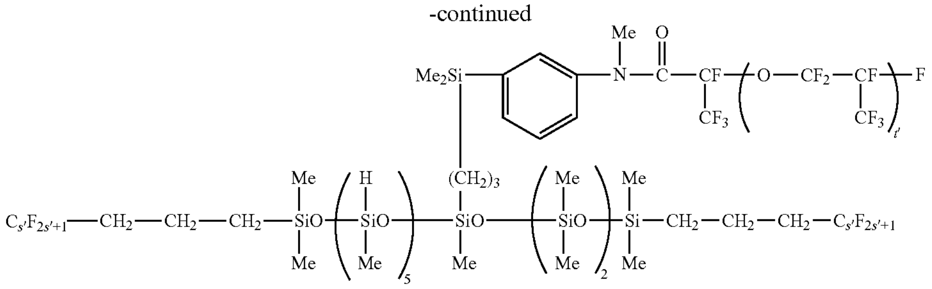
wherein s' is an integer of 1 to 10 and t' is an integer of 1 to 50. The repeating units may be randomly arranged.
[Chem. 31]
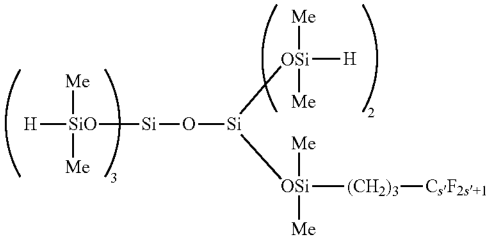
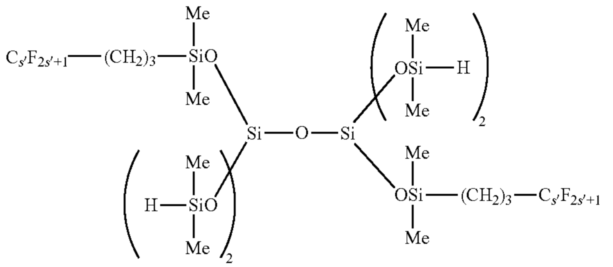
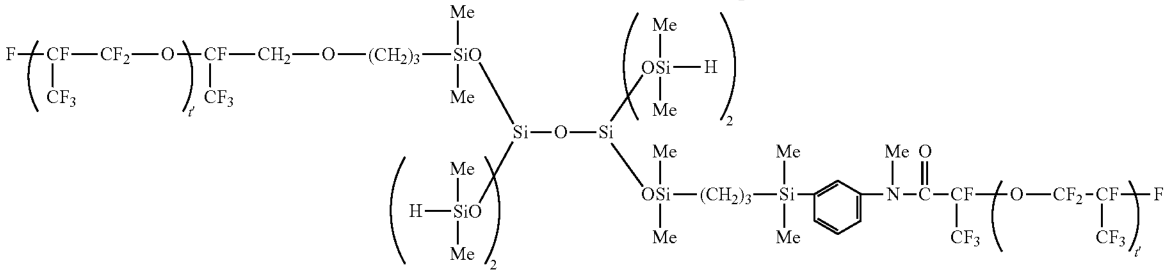
wherein s' is an integer of 1 to 10 and t' is an integer of 1 to 50.
[Chem. 32]
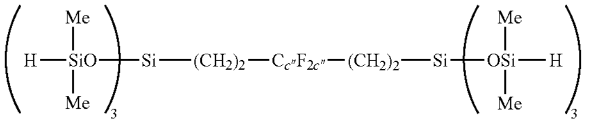
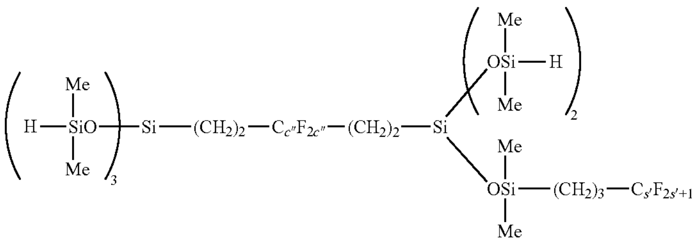

-continued
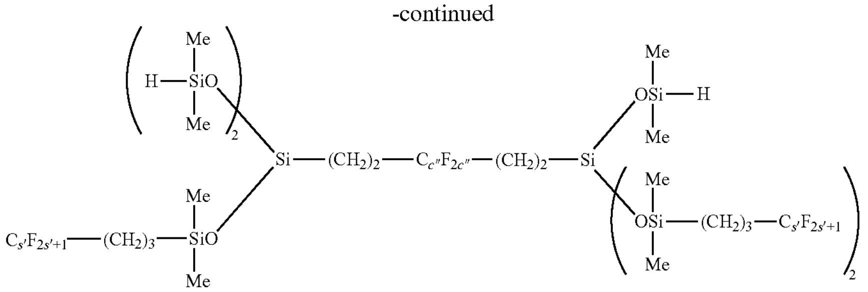
wherein t' is an integer of 1 to 50 and c" is an integer of 1 to 20.
[Chem. 33]
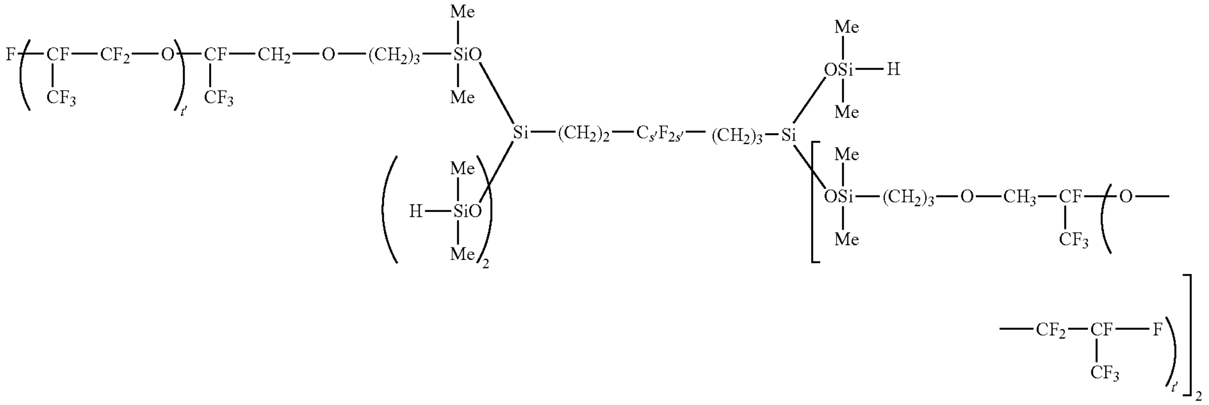
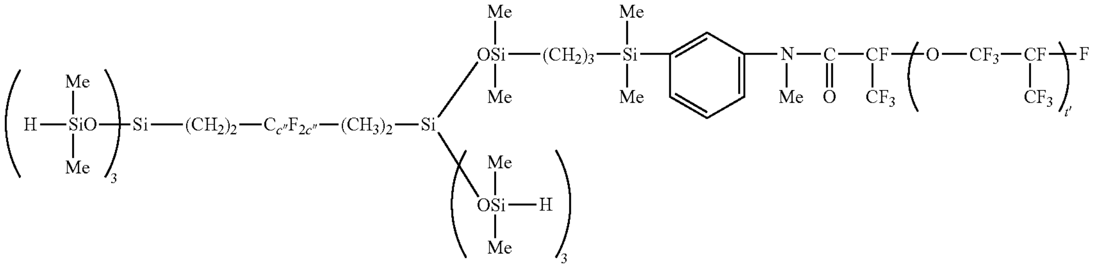
wherein t' is an integer of 1 to 50 and c" is an integer of 1 to 20.
[Chem. 34]
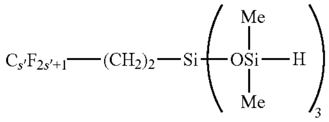
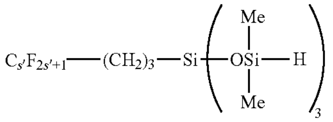
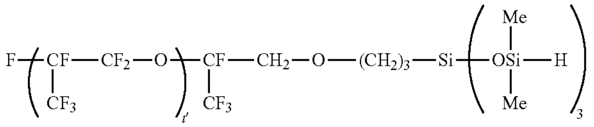
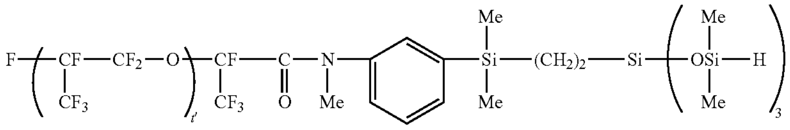

wherein s' is an integer of 1 to 10 and t' is an integer of 1 to 50.

One kind of the component (B) may be used alone, or two or more kinds thereof may be used in combination.

[Chem. 35]

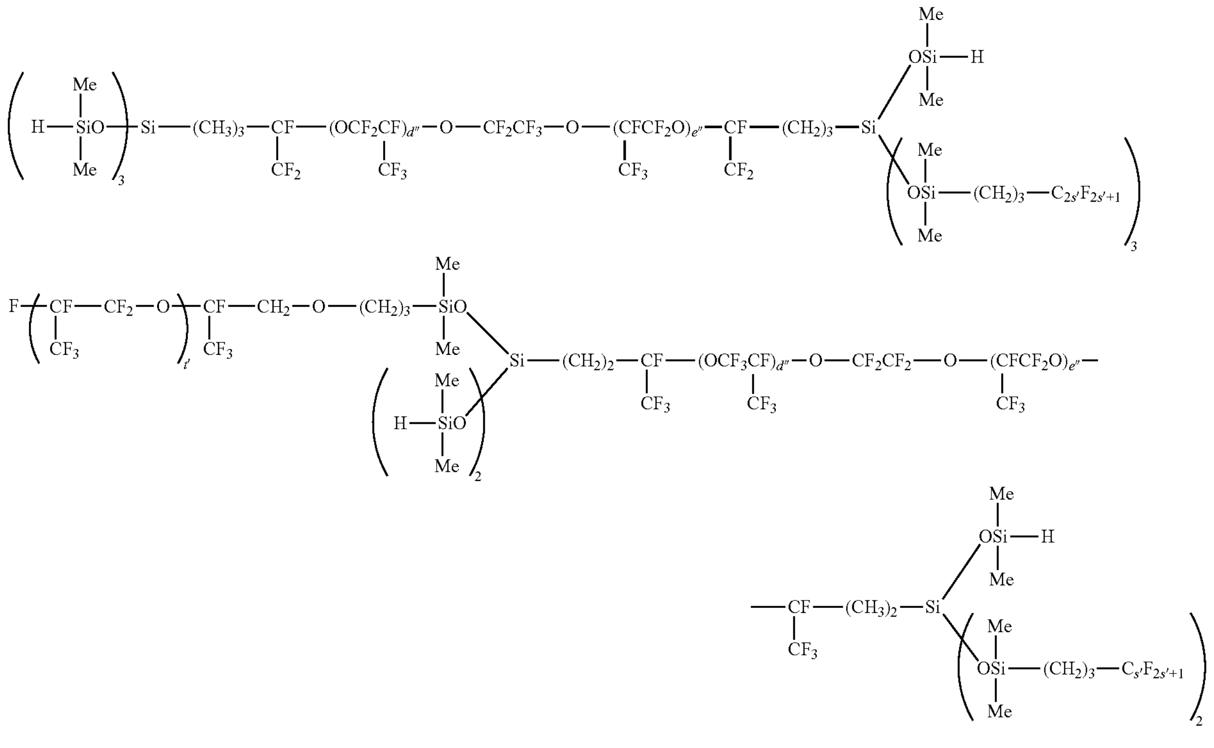

wherein s' is an integer of 1 to 10, t' is an integer of 1 to 50, d" and e" are each an integer of 1 to 100, and d"+e" is an integer of 2 to 200.

The compounding amount of the component (B) is such that the amount of hydrogen atoms directly bonded to silicon atoms (SiH groups) in the component (B) is 0.50 to 3.0 mol,

[Chem. 36]

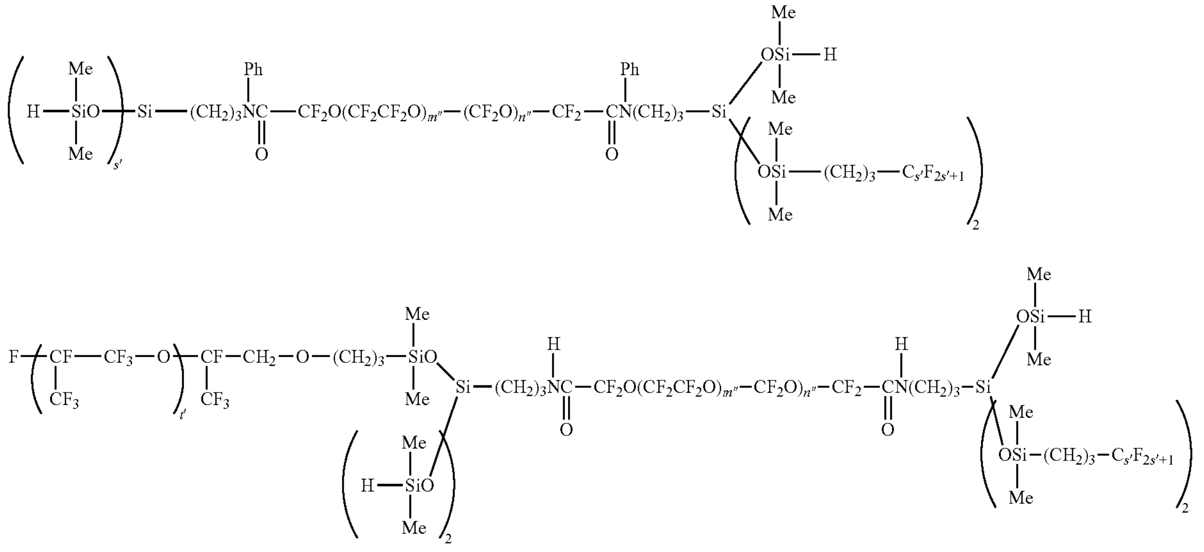

wherein s' is an integer of 1 to 10, t' is an integer of 1 to 50, and m" and n" are each an integer of 1 to 50. The repeating units may be randomly arranged.

more preferably 0.60 to 2.0 mol, based on 1 mol of alkenyl groups contained in the thermally conductive fluorine-containing curable composition. If the amount of the SiH groups is less than 0.50 mol, there is a possibility that the degree of crosslinking becomes insufficient. If, on the other hand, the amount is more than 3.0 mol, there is a possibility that the storage stability is impaired, or the heat resistance of a cured product obtained after curing is deteriorated.

[Component (C)]

The platinum group metal-based catalyst as the component (C) is a hydrosilylation reaction catalyst. The hydrosilylation reaction catalyst is a catalyst that promotes an addition reaction between an alkenyl group contained in the thermally conductive fluorine-containing curable composition, in particular an alkenyl group in the component (A), and a SiH group contained in the composition, in particular a SiH group in the component (B). This platinum group metal-based catalyst that is a hydrosilylation reaction catalyst is generally a noble metal or a compound thereof and is expensive, and thus platinum or a platinum compound, which is relatively easily available, is frequently used.

Examples of the platinum compound include, for example, chloroplatinic acid, a complex of chloroplatinic acid and an olefin, such as ethylene, a complex of platinum and alcohol or vinylsiloxane, and metallic platinum supported on silica, alumina, carbon, or the like. As platinum group metal-based catalysts other than platinum and platinum compounds, rhodium-, ruthenium-, iridium-, and palladium-based compounds are also known, and examples thereof include $RhCl(PPh_3)_3$, $RhCl(CO)(PPh_3)_2$, $Ru_3(CO)_{12}$, $IrCl(CO)(PPh_3)_2$, $Pd(PPh_3)_4$, and the like. In the formulas, Ph is a phenyl group.

In the use of these catalysts, the catalyst may be used in a solid state when the catalyst is a solid catalyst. In order to obtain a more uniform cured product, for example, it is preferable to use a catalyst obtained by dissolving chloroplatinic acid or a complex in an appropriate solvent, such as toluene or ethanol, and compatibilizing the solution with the linear polyfluoro compound as the component (A).

The compounding amount of the component (C) is an effective amount as the hydrosilylation reaction catalyst, and is usually 0.1 to 2,000 ppm, preferably 0.1 to 500 ppm, and particularly preferably 0.5 to 200 ppm (in terms of the weight of platinum group metal atoms) with respect to the component (A), but may be appropriately increased or decreased depending on a desired curing rate.

[Component (D)]

The component (D) is a thermally conductive filler used to impart thermal conductivity to the thermally conductive fluorine-containing curable composition. Examples thereof include, for example, metals, such as aluminum, nonmagnetic copper, nickel, carbon black, and metallic silicon, metal oxides, such as alumina, magnesium oxide, beryllium oxide, chromium oxide, and titanium oxide, metal nitrides, such as boron nitride, silicon nitride, and aluminum nitride, metal hydroxides, such as aluminum hydroxide, metal carbides, such as boron carbide, titanium carbide, and silicon carbide, soft magnetic alloys, such as Fe—Si alloy, Fe—Al alloy, Fe—Al—Si alloy, Fe—Si—Cr alloy, Fe—Ni alloy, Fe—Ni—Co alloy, Fe—Al—Si—Cr alloy, Fe—Si—B alloy, and Fe—Si—Co—B alloy, ferrites, such as Mn—Zn ferrite, Mn—Mg—Zn ferrite, Mg—Cu—Zn ferrite, Ni—Zn ferrite, Ni—Cu—Zn ferrite, and Cu—Zn ferrite, and mixtures of two or more thereof.

When electrical insulating properties are required in the present invention, the component (D) is preferably a metal oxide, a metal nitride, a metal hydroxide, or a metal carbide, more preferably a metal oxide, and particularly preferably alumina.

Alumina as the component (D) is preferably amorphous alumina or spherical alumina for the reason that thermal conductivity is advantageously enhanced, and these two types may be used alone or in combination.

The average particle size of the amorphous alumina is preferably 0.2 to 5 μm, more preferably 0.4 to 4 μm. When the average particle size is 0.2 μm or more, the viscosity of the thermally conductive fluorine-containing curable composition is increased, and there is no possibility that the workability and the forming processability of the composition are deteriorated. When, on the other hand, the average particle size is 5 μm or less, there is no possibility that the electrical insulating properties of a cured product obtained by curing the thermally conductive fluorine-containing curable composition are impaired. A single kind of amorphous alumina may be used alone, or two or more kinds thereof may be used in combination. Incidentally, the amorphous alumina that is used may be a common commercial product. Incidentally, the average particle size may be usually determined as, for example, the cumulative volume average diameter $D_{50}$ (or the median diameter) in grain size distribution measurement by laser light diffractometry, and is specifically a value of the volume-based cumulative 50% particle diameter ($D_{50}$) measured with particle size distribution analyzer MT3000II manufactured by MicrotracBEL Corp.

The average particle size of the spherical alumina is preferably 5 to 100 μm, more preferably 7 to 90 μm. When the average particle size is 5 μm or more, the viscosity of the thermally conductive fluorine-containing curable composition is increased, and there is no possibility that the workability and the forming processability of the composition are deteriorated. When, on the other hand, the average particle size is 100 μm or less, there is no possibility that the spherical alumina is not uniformly dispersed in the thermally conductive fluorine-containing curable composition. A single kind of spherical alumina may be used alone, or two or more kinds thereof may be used in combination. Incidentally, the spherical alumina that is used may be a common commercial product. The average particle size is a value measured in the same manner as the average particle size of amorphous alumina.

The use amount of the component (D) is in the range of 100 to 4,000 parts by weight, preferably 200 to 3,500 parts by weight, per 100 parts by weight of the component (A). If the amount is less than 100 parts by weight, there is a possibility that the thermal conductivity of a cured product obtained by curing the thermally conductive fluorine-containing curable composition is not sufficient. If the amount is more than 4,000 parts by weight, there is a possibility that the component (D) is not uniformly dispersed in the thermally conductive fluorine-containing curable composition.

[Component (E)]

Where necessary, a component (E) (optional component) may be optionally added to the thermally conductive fluorine-containing curable composition. This component is a fluorine-containing organosilicon compound having, in one molecule, one or more perfluoroalkyl groups or perfluorooxyalkyl groups bonded to a silicon atom directly bonded to an alkoxy group, via a divalent hydrocarbon group that may contain a carbon atom, a silicon atom, an oxygen atom, and a nitrogen atom. The fluorine-containing organosilicon compound is more preferably a fluorine-containing organosilicon compound having, in one molecule, one or more of the monovalent fluorine-containing organic groups, and further having one or more alkoxy groups directly bonded to silicon atoms, and free of a hydrogen atom directly bonded to a silicon atom (a SiH group).

The component (E) serves as a surface treatment agent and/or a dispersant (a wetter) for the component (D). The component (D) is hydrophobized by the component (E) during the preparation of the thermally conductive fluorine-containing curable composition to enhance the wettability of the component (D) with respect to the component (A) and thereby allows the component (D) to be added in a large amount to the component (A). Furthermore, the dispersibility of the component (D) in the composition can also be enhanced.

The perfluoroalkyl groups and the perfluorooxyalkyl groups are groups introduced from the points of view of the compatibility with the component (A), dispersibility, and the like.

Examples of the perfluoroalkyl group or the perfluorooxyalkyl group include groups having the following general formula (11) or (12):

$$C_kF_{2k+1}— \quad (11)$$

wherein k is an integer of 1 to 10, preferably an integer of 3 to 7.

[Chem. 37]

(12)

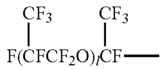

wherein l is an integer of 1 to 50, preferably an integer of 2 to 30.

It is preferable that the perfluoroalkyl group or the perfluorooxyalkyl group be connected to a silicon atom directly bonded to an alkoxy group, via a divalent hydrocarbon group (linking group) that may contain a carbon atom, a silicon atom, an oxygen atom, and a nitrogen atom. Examples of the divalent hydrocarbon group include alkylene groups, arylene groups, and combinations thereof. The groups mentioned above may be interrupted with, for example, one or more structures selected from the group consisting of ether-bonding oxygen atoms, amide bonds, carbonyl bonds, ester bonds, and diorganosilylene groups, such as dimethylsilylene groups. For example, those having 2 to 20 carbon atoms can be mentioned, such as:

$—CH_2CH_2—$,
$—CH_2CH_2CH_2—$,
$—CH_2CH_2CH_2OCH_2—$,
$—CH_2CH_2CH_2—NH—CO—$,
$—CH_2CH_2CH_2—N(Ph)\text{-}CO—$,
$—CH_2CH_2CH_2—N(CH_3)—CO—$,
$—CH_2CH_2CH_2—N(CH_2CH_3)—CO—$,
$—CH_2CH_2CH_2—N(CH(CH_3)_2)—CO—$,
$—CH_2CH_2CH_2—O—CO—$,
$—CH_2CH_2CH_2—Si(CH_3)_2—O—Si(CH_3)_2—CH_2CH_2CH_2—$,
$—CH_2OCH_2CH_2CH_2—Si(CH_3)_2—O—Si(CH_3)_2—CH_2CH_2—$,
$—CO—N(CH_3)\text{-}Ph'—Si(CH_3)_2—CH_2CH_2—Si(CH_3)_2—O—Si(CH_3)_2—CH_2CH_2—$,
$—CO—N(CH_3)\text{-}Ph'—Si(CH_3)_2—CH_2CH_2—Si(CH_3)_2—O—Si(CH_3)_2—CH_2CH_2CH_2—$,
$—CO—NH\text{-}Ph'—[Si(CH_3)_2—CH_2CH_2]_3—CH_2—$, and
$—CO—N(CH_3)\text{-}Ph'—[Si(CH_3)_2—CH_2CH_2]_3—$ wherein Ph is a phenyl group and Ph' is a phenylene group. In the above structures, preferably, the left end is bonded to the silicon atom and the right end is bonded to the perfluoroalkyl group or the perfluorooxyalkyl group.

The component (E) preferably has the following general formula (8):

$$D_{g'}R^{14}_{h'}Si(OR^6)_{4-g'-h'} \quad (8)$$

wherein D independently at each occurrence denotes the perfluoroalkyl group or the perfluorooxyalkyl group described hereinabove that is bonded to the silicon atom directly bonded to an alkoxy group, via a divalent hydrocarbon group that may contain a carbon atom, a silicon atom, an oxygen atom, and a nitrogen atom. Furthermore, $R^6$ independently at each occurrence denotes an alkyl group having 1 to 6 carbon atoms, preferably an alkyl group having 1 to 4 carbon atoms, particularly preferably a methyl group or an ethyl group. $R^{14}$ independently at each occurrence denotes an unsubstituted or substituted monovalent hydrocarbon group, and examples thereof include the same groups as those described hereinabove as the unsubstituted or substituted monovalent hydrocarbon groups free of an aliphatic unsaturated bond for $R^1$ and $R^2$. Furthermore, g' is an integer of 1 to 3, h' is an integer of 0 to 2, and g'+h' is an integer of 1 to 3.

Specific examples of the component (E) include the following compounds. In the formulas below, Me represents a methyl group and Et represents an ethyl group.

[Chem. 38]

$(C_{q'}F_{2q'+1}CH_2CH_2)_2Si(Me)(OMe)$ $(C_{q'}F_{2q'+1}CH_2CH_2CH_2)_2Si(Me)(OEt)$ $C_{q'}F_{2q'+1}CH_2CH_2CH_2SiMe_2OSiMe_2CH_2CH_2CH_2Si(OMe)_3$

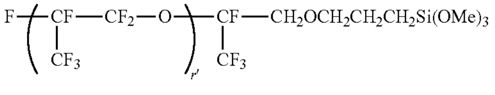

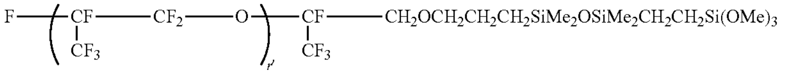

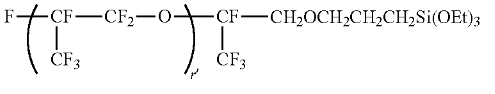

wherein q' is an integer of 1 to 10 and r' is an integer of 1 to 50.

tion and can further impart appropriate hardness to a cured product obtained by curing the composition.

[Chem. 39]

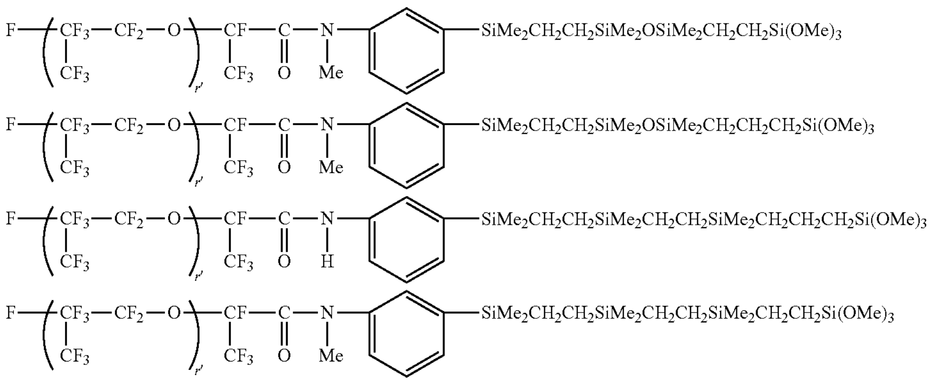

wherein r' is an integer of 1 to 50.

One kind of the component (E) may be used alone or two or more kinds thereof may be used in combination.

The compounding amount of the component (E) is 0.01 to 300 parts by weight, more preferably 0.10 to 250 parts by weight, per 100 parts by weight of the component (A). If the amount is less than 0.01 part by weight, there is a possibility that the surface treatment on the component (D) by the component (E) is insufficient. If, on the other hand, the amount is more than 300 parts by weight, there is a possibility that the mechanical strength of a cured product obtained by curing the thermally conductive fluorine-containing curable composition is impaired.

[Component (F)]

Where necessary, a component (F) (optional component) may be further added optionally to the thermally conductive fluorine-containing curable composition. This component is at least one non-functional polyfluoro compound (specifically, a polyfluoro compound that does not contain a functional group capable of participating at least in a hydrosilylation addition reaction, such as an alkenyl group or a SiH group, in the molecule) selected from the group consisting of compounds having the following general formula (3) and the following general formula (4):

$$F—(CF_2CF_2CF_2O)_a—A \quad (3)$$

wherein A is a group having $—C_bF_{2b+1}$ (b is an integer of 1 to 3) and a is an integer of 1 to 500, preferably an integer of 2 to 300, $$A—\{(OCF(CF_3)CF_2)_c—(OCF_2CF_2)_d—(OCF_2)_{u'}\}—O—A \quad (4)$$

wherein A is the same as above, c and d are each an integer of 0 to 300, preferably an integer of 0 to 150, c and d are not 0 at the same time, and u' is an integer of 1 to 300, preferably an integer of 1 to 150. The repeating units may be randomly arranged.

The component (F) can impart appropriate fluidity to the thermally conductive fluorine-containing curable composition and can further impart appropriate hardness to a cured product obtained by curing the composition.

Specific examples of the component (F) include the following:

$$F—(CF_2CF_2CF_2O)_{i'}—CF_2CF_3$$

wherein i' is an integer of 1 to 200.

$$CF_3—\{(OCF(CF_3)CF_2)_{j'}—(OCF_2)_{k'}\}—O—CF_3$$

wherein j' is an integer of 1 to 200, and k' is an integer of 1 to 200. The repeating units may be randomly arranged.

$$CF_3—\{(OCF(CF_3)CF_2)_{v'}—(OCF_2)_{w'}\}—O—CF_3$$

wherein v' is an integer of 1 to 200, and w' is an integer of 1 to 200. The repeating units may be randomly arranged.

One kind of the component (F) may be used alone or two or more kinds thereof may be used in combination.

When the component (F) is blended in the composition, the compounding amount thereof is 0.1 to 300 parts by weight, more preferably 0.5 to 250 parts by weight, per 100 parts by weight of the component (A). When the amount is 0.1 part by weight or more, there is no possibility that the contribution is insufficient to the fluidity of the thermally conductive fluorine-containing curable composition and to the hardness of a cured product obtained by curing the composition. When, on the other hand, the amount is 300 parts by weight or less, there is no possibility that bleeding occurs from a cured product obtained by curing the thermally conductive fluorine-containing curable composition.

[Component (G)]

Where necessary, a polyfluoromonoalkenyl compound having one alkenyl group in one molecule and a perfluoropolyether structure in a main chain may be further added optionally as a component (G) (optional component) to the thermally conductive fluorine-containing curable composition.

The component (G) can impart appropriate fluidity to the thermally conductive fluorine-containing curable composition and can further impart appropriate hardness to a cured product obtained by curing the composition The component (G) is particularly preferably a polyfluoromonoalkenyl compound having the following general formula (9):

$$Rf—(Y)_h—CH=CH_2 \quad (9)$$

wherein Rf is a group having the following general formula (10).

$$F—[CF(CF_3)CF_2O]_i—C_jF_{2j}— \quad (10)$$

wherein i is an integer of 1 to 200, preferably an integer of 1 to 150, and j is an integer of 1 to 3.

Y is $—CH_2—$, $—OCH_2—$, $—CH_2OCH_2—$, or $—CO—NR^{15}—Z—$ wherein these groups are bonded to Rf at the left end and bonded to the carbon atom at the right end, $R^{15}$ is a hydrogen atom, a methyl group, a phenyl group, or an allyl group, and Z is $—CH_2—$, a group having the following structural formula (Z), or a group having the following structural formula (Z'):

[Chem. 40]

(Z)

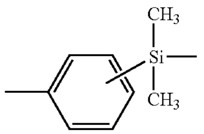

wherein the group is an o-, m-, or p-dimethylphenylsilylene group wherein the left end is bonded to the nitrogen atom and the right end is bonded to the carbon atom,

[Chem. 41]

(Z')

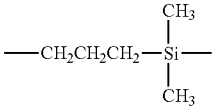

wherein the left end is bonded to the nitrogen atom and the right end is bonded to the carbon atom, and h is 0 or 1.

Specific examples of the component (G) include the following. In the following formulas, Me represents a methyl group.

[Chem. 42]

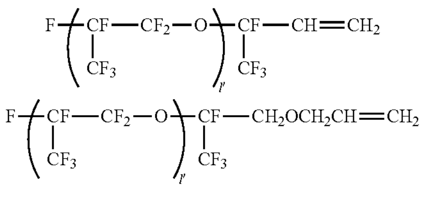

-continued

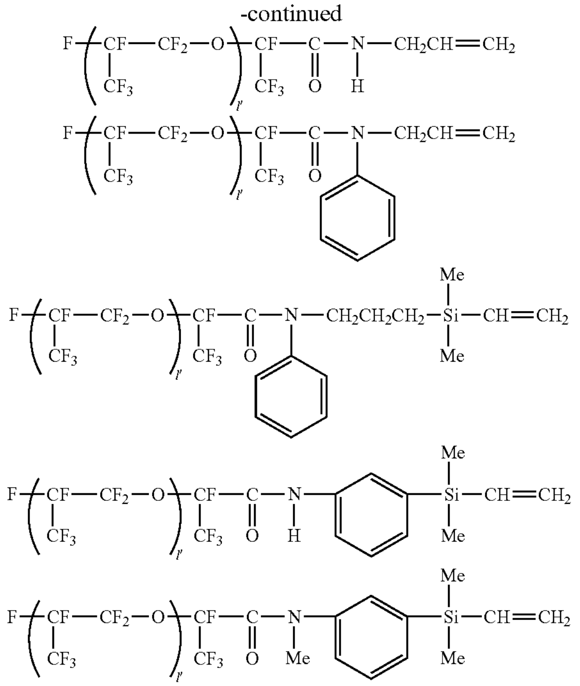

wherein l' is an integer of 1 to 200.

One kind of the component (G) may be used alone or two or more kinds thereof may be used in combination.

When the component (G) is blended in the composition, the compounding amount thereof is 0.1 to 100 parts by weight, preferably 0.5 to 80 parts by weight, per 100 parts by weight of the component (A). When the amount is 0.1 part by weight or more, there is no possibility that the contribution is insufficient to the fluidity of the thermally conductive fluorine-containing curable composition and to the hardness of a cured product obtained by curing the composition. When, on the other hand, the amount is 100 parts by weight or less, there is no possibility that the mechanical strength of a cured product obtained by curing the thermally conductive fluorine-containing curable composition is impaired.

[Other Components]

Where necessary, in addition to the components (A) to (G), various additives, such as inorganic fillers (other than the component (D)) and addition reaction controlling agents, may be added as optional components to the thermally conductive fluorine-containing curable composition in order to enhance the practicability thereof. The compounding amounts of these additives are arbitrary.

Examples of the inorganic fillers other than the component (D) include, for example, silica-based reinforcing fillers including silica powders, such as fumed silica (fumed silica or dry silica), precipitated silica (wet silica), spherical silica (fused silica), sol-gel silica, and silica aerogel, or silica powders obtained by treating the surface of the above silica powders with various organochlorosilanes, organodisilazanes, cyclic organopolysilazanes, or the like, and silica powders obtained by further retreating the surface-treated silica powders with organosilanes or organosiloxanes having a perfluoroalkyl group of the above general formula (11) or a perfluorooxyalkyl group of the above general formula (12), reinforcing or quasi-reinforcing fillers, such as quartz powders (crystalline silica), fused quartz powders, diatomaceous earth, and calcium carbonate, and inorganic pigments, such as titanium oxide, iron oxide, carbon black, and cobalt aluminate.

Examples of the hydrosilylation addition reaction controlling agents include, for example, acetylenic alcohols, such as 1-ethynyl-1-hydroxycyclohexane, 3-methyl-1-butyn-3-ol, 3,5-dimethyl-1-hexyn-3-ol, 3-methyl-1-penten-3-ol, and phenylbutynol; reaction products of a chlorosilane having a perfluoroalkyl group of the general formula (11) or a perfluorooxyalkyl group of the general formula (12) and an acetylenic alcohol; 3-methyl-3-penten-1-yne, 3,5-dimethyl-3-hexen-1-yne; triallyl isocyanurate; polyvinylsiloxane; and organophosphorus compounds. The addition of these agents makes it possible to maintain curing reactivity and storage stability appropriately.

The method for producing the thermally conductive fluorine-containing curable composition is not particularly limited, and the thermally conductive fluorine-containing curable composition can be produced by kneading the components (A) to (G) and other optional components uniformly. When the component (E) is blended, it is preferable that the components (A), (D), and (E), and further the component (F) and the component (G) as required be kneaded first, subsequently the component (C) be kneaded, and lastly the component (B) be kneaded, thereby ensuring that the component (D) is surface-treated with the component (E) efficiently. Other optional components may be kneaded as appropriate. The component (D) and the component (E) may be added all at once or may be added in portions. A mixing device, such as a planetary mixer, Ross mixer, or Hobart mixer, or further a kneading device as required, such as a kneader or a three-roll mill, may be used as the production apparatus.

Regarding the configuration of the thermally conductive fluorine-containing curable composition, the components (A) to (G) and other optional components may be all handled as one composition, that is, may be configured as a so-called one-pack type, or may be configured as a two-pack type and the two may be mixed at the time of use.

The thermally conductive fluorine-containing curable composition is cured by heating to give a cured product having good oil resistance and thermal conductivity. The curing temperature of the composition is not particularly limited, but is usually 20 to 200° C., preferably 40 to 180° C. In that case, the curing time may be selected as appropriate, but is generally preferably 30 seconds to 5 hours, and more preferably 1 minute to 3 hours.

The thermal conductivity of a cured product obtained by curing the thermally conductive fluorine-containing curable composition is 1.0 W/m·K or more, preferably 1.2 W/m·K or more as measured at 25° C. by a hot disk method. If the thermal conductivity is less than 1.0 W/m·K, it may be difficult to apply the cured product to a heating element that generates a large amount of heat.

The hardness of a cured product obtained by curing the thermally conductive fluorine-containing curable composition as measured with a type E durometer specified in JIS K6253-3 (so-called Asker E hardness for soft rubbers) is preferably 60 or less, and more preferably 50 or less. The hardness is preferably 1 or more. When the hardness is 60 or less, the cured product can deform so as to follow the shape of a body from which heat is to be dissipated, and can exhibit good thermal conductivity without applying stress to the body from which heat is to be dissipated.

[Method for Producing Thermally Conductive Sheet Product]

Examples of the method for producing the thermally conductive sheet product of the present invention include a press forming method in which the electrically insulating film is laid on a metal plate, a sheet mold is placed thereon and is charged with the thermally conductive fluorine-containing curable composition described hereinabove, another of the electrically insulating film and subsequently a metal plate are placed thereon, and the resulting stack is hot pressed with a hot press machine to cure the composition into a sheet form, thereby obtaining a thermally conductive sheet product of the present invention; and a continuous forming method in which the thermally conductive fluorine-containing curable composition is discharged onto the electrically insulating film having a long length to coat the electrically insulating film with a uniform thickness using a knife coater, a comma coater, or the like, and is subsequently thermally cured, and further another of the electrically insulating film is attached onto the cured product using a lamination roll or the like, thereby obtaining a thermally conductive sheet product of the present invention.

The pressure of the pressing in the press forming method is not particularly limited and may be selected as appropriate. If the pressure is excessively low or excessively high, there is a possibility that the thermally conductive fluorine-containing curable composition is not cured with a desired thickness. Thus, the pressure is preferably 0.1 to 100 MPa, and more preferably 1 to 50 MPa.

The heating temperature at the time of pressing in the press forming method is the same as the curing temperature of the thermally conductive fluorine-containing curable composition described hereinabove. Furthermore, the pressing time is the same as the curing time of the thermally conductive fluorine-containing curable composition described hereinabove. The thermally conductive sheet product after the press forming may be post-cured by being allowed to stand in an oven at the above curing temperature.

In the continuous forming method, on the other hand, the thermally conductive fluorine-containing curable composition is continuously applied with a uniform thickness onto the electrically insulating film using a conventional coating device equipped with a heating furnace and a coiling device, such as a knife coater, a comma coater, or a kiss coater, and is subsequently thermally cured by being passed through the heating furnace. The curing temperature and the curing time in this process are the same as the curing temperature and the curing time of the thermally conductive fluorine-containing curable composition described hereinabove. Subsequently, another of the electrically insulating film is attached onto the thermally conductive sheet composed of the cured product of the thermally conductive fluorine-containing curable composition using a lamination roll or the like. The electrically insulating film may be attached after the thermally conductive sheet is post-cured by being left in an oven at the above curing temperature. Alternatively, the thermally conductive sheet may be post-cured by being left in an oven at the above curing temperature after the electrically insulating film is attached thereto.

In the continuous forming method, the thermally conductive fluorine-containing curable composition may be diluted with an appropriate solvent, for example, an organic solvent, such as toluene, acetone, or methyl ethyl ketone, or a fluorinated solvent, such as 1,3-bis(trifluoromethyl)benzene, Fluorinert (manufactured by 3M), perfluorobutyl methyl ether, or perfluorobutyl ethyl ether, for purposes, such as workability in coating the electrically insulating film and coating weight control.

In the thermally conductive sheet product of the present invention produced as described above, the thickness of the thermally conductive sheet composed of the cured product obtained by curing the thermally conductive fluorine-containing curable composition is preferably 0.1 to 10 mm, and more preferably 0.5 to 5 mm.

Furthermore, the thermally conductive sheet product of the present invention produced as described above may be cut into a desired size as required.

The thermally conductive sheet product of the present invention has good thermal conductivity and is therefore suitable as a heat transfer member that is interposed between a heat-generating member, such as a semiconductor, for example, a CPU, an LSI, or an IGBT, and a heat-dissipating member, such as a heat sink, and thereby transfers heat from the heat-generating member to the heat-dissipating member and allows the heat to dissipate. Furthermore, the thermally conductive sheet product of the present invention has good oil resistance and therefore can be used even in an environment where it is exposed to automotive oils, such as ATF and CVTF, thus finding suitable use as a heat transfer member in on-vehicle electric/electronic parts, such as LED head lamps, ECUs, and further on-board batteries, motors, and converters for next-generation automobiles, such as hybrid cars and electric vehicles. In addition, the thermally conductive sheet product of the present invention has the electrically insulating films attached on both sides of the thermally conductive sheet, thus the thermally conductive sheet is protected from foreign matter and the like, and the thermally conductive sheet product can be produced directly by a press forming method or the like, and is interposable between a heat-generating member and a heat-dissipating member with excellent workability.

EXAMPLES

Hereinafter, the present invention is described in detail with reference to Examples, Comparative Examples, and Reference Examples, but the present invention is not limited to the following Examples. The viscosity of the component (A) is a value measured at 23° C. as specified in JIS K7117-1. The vinyl group content in the component (A) was measured by infrared spectroscopy (IR) using a calibration curve. The SiH group content in the component (B) was measured by proton nuclear magnetic resonance spectroscopy ($^1$H-NMR) using an internal standard substance. Furthermore, the average particle size of the component (D) is a value of the volume-based cumulative 50% particle diameter ($D_{50}$) measured with particle size distribution analyzer MT3000II manufactured by MicrotracBEL Corp.

The components (A) to (G) and the compound as a hydrosilylation addition reaction controlling agent used in Examples, Comparative Examples, and Reference Examples are illustrated below. In the following examples, Me represents a methyl group.

Component (A):

(A-1) Linear polyfluoro compound having the following formula (23)
(viscosity: 10,900 mPa·s, vinyl group content: 0.0122 mol/100 g)

[Chem. 43]

(23)

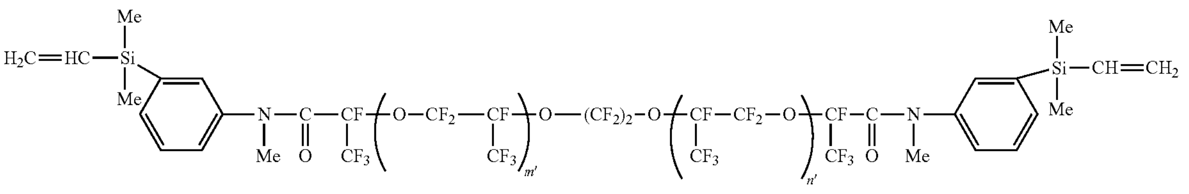

wherein m' and n' are integers of 1 or more, and the average value of m'+n' is 90.

(A-2) Linear polyfluoro compound having the following formula (24)
(viscosity: 11,000 mPa·s, vinyl group content: 0.0122 mol/100 g)

[Chem. 44]

(24)

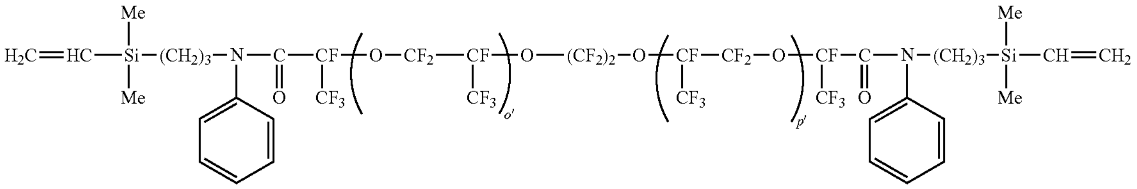

wherein o' and p' are integers of 1 or more, and the average value of o'+p' is 90.

Component (B):

(B-1) Fluorine-containing organohydrogensiloxane having the following formula (25)

(SiH group content: 0.394 mol/100 g)

[Chem. 45]

(25)

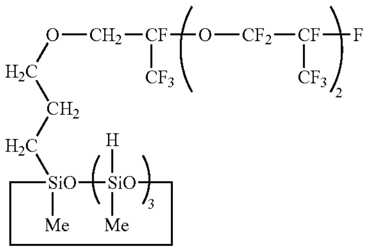

(B-2) Fluorine-containing organohydrogensiloxane having the following formula (26)

(SiH group content: 0.0615 mol/100 g)

[Chem.46]

(26)

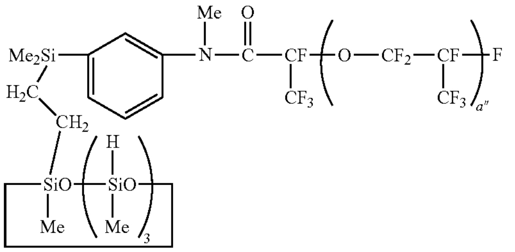

wherein the average value of a" is 24.

Component (C):

(C-1) Toluene solution of platinum-divinyltetramethyldisiloxane complex (platinum concentration: 0.5 wt %)

Component (D):

Amorphous alumina and spherical alumina having the following average particle sizes.

(D-1) Amorphous alumina having an average particle size of 1 μm (D-2) Spherical alumina having an average particle size of 10 μm (D-3) Spherical alumina having an average particle size of 45 μm (D-4) Spherical alumina having an average particle size of 70 μm Component (E):

(E-1) Fluorine-containing organosilicon compound having the following formula (27)

[Chem. 47]

(27)

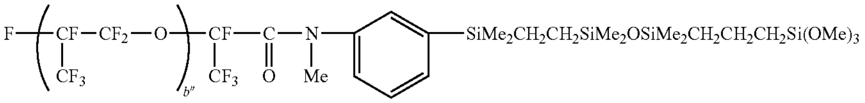

wherein the average value of b" is 24.

(E-2) Fluorine-containing organosilicon compound having the following formula (28)

[Chem. 48]

(28)

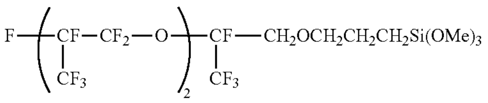

Component (F):

(F-1) Non-functional polyfluoro compound having the following formula (29)

$$F—(CF_2CF_2CF_2O)_{x'}—CF_2CF_3 \quad (29)$$

wherein the average value of x' is 30.

(F-2) Non-functional polyfluoro compound having the following formula (30)

$$CF_3—(OCF(CF_3)CF_2)_{y'}—OCF_2—O—CF_3 \quad (30)$$

wherein the average value of y' is 17.

Component (G):

(G-1) Polyfluoromonoalkenyl compound having the following formula (31)

(vinyl group content: 0.0239 mol/100 g)

[Chem. 49]

(31)

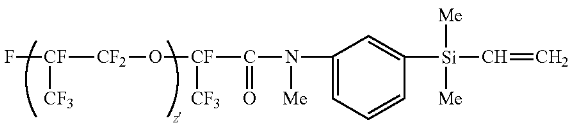

wherein the average value of z' is 24.

Hydrosilylation addition reaction controlling agent: Compound having the following formula (32)

[Chem. 50]

(32)

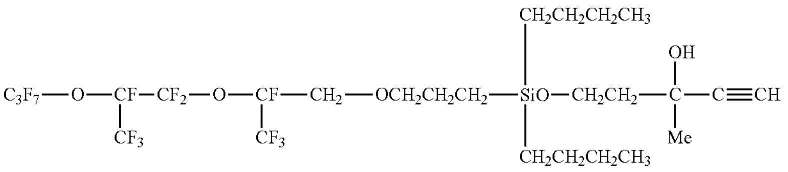

Compositions 1 to 5 were prepared as follows using predetermined amounts of the components (A) to (G) and the compound having the formula (32) as shown in Tables 1 and 2 below, and were formed and cured, and the cured products were analyzed by the following methods to measure the thermal conductivity of the cured products and the hardness of the cured products. The results are shown in Tables 1 and 2 below. Furthermore, the ATF durability of the cured products was measured in accordance with the method described below. The results are shown in Tables 3 and 4 below.

[Preparation of Compositions]

First, the components (A), (D), (E), (F), and (G) were kneaded in predetermined amounts shown in Tables 1 and 2 below for 1 hour using a planetary mixer. Next, the component (C) and the compound having the formula (32) were added in predetermined amounts shown in Tables 1 and 2 below, and the mixture was kneaded for 30 minutes. Lastly, the component (B) was added in a predetermined amount shown in Tables 1 and 2 below, and the mixture was kneaded for 30 minutes. Compositions 1 to 5 were thus obtained.

[Preparation of Cured Products]

A 100 μm thick PET film surface-treated with fluorine-containing silicone release agent X-70-201S (manufactured by Shin-Etsu Chemical Co., Ltd.) was placed on a metal plate so that the surface-treated side would be upward. Next, a mold consisting of a 60 mm×60 mm×6 mm frame was placed on the PET film, and any of the compositions 1 to 5 obtained as described above was poured to fill the inside of the frame. Another of the PET film was placed on top so that the surface-treated side would be downward, and a metal plate was placed thereon. The resultant stack was press-heated with a hot press forming machine at a pressure of 10 MPa and 120° C. for 10 minutes. The upper and lower metal plates were removed from the stack, and a single-edged knife was inserted along the mold frame to cut out a 60 mm×60 mm×6 mm thick sheet-shaped cured product having the PET films attached on both sides, and the PET films on both sides were removed. The 6 mm thick sheet-shaped cured product was thus obtained.

[Thermal Conductivity of Cured Products]

Using two sheets of the 6 mm thick sheet-shaped cured product, the thermal conductivity at 25° C. was measured by a hot disk method using thermal measuring instrument TPS2500S (manufactured by Kyoto Electronics Manufacturing Co., Ltd.).

[Hardness of Cured Products]

Two sheets of the 6 mm thick sheet-shaped cured product were stacked, and the hardness was measured with a type E durometer in accordance with JIS K6253-3.

[ATF (Automotive Oil) Durability of Cured Products]

The 6 mm thick sheet-shaped cured product was immersed in automotive oil ATF WS3324 manufactured by Toyota Motor Corporation at 150° C. for 1,000 hours, and the thermal conductivity was measured in the same manner as above.

TABLE 1

| Components (parts by weight) | | Composition 1 | Composition 2 | Composition 3 |
|---|---|---|---|---|
| Component (A) | (A-1) | 100 | 100 | — |
| | (A-2) | — | — | 100 |
| Component (B) | (B-1) | 2.79 | — | — |
| | (B-2) | — | 18.9 | 19.8 |
| Component (C) | (C-1) | 0.60 | 0.60 | 0.60 |
| Component (D) | (D-1) | 80 | 320 | 500 |
| | (D-2) | 50 | — | 100 |
| | (D-3) | 50 | — | 100 |
| | (D-4) | 50 | — | 100 |
| Component (E) | (E-1) | — | 20.0 | — |
| | (E-2) | — | — | 10.0 |
| Component (F) | (F-1) | — | — | 20.0 |
| | (F-2) | — | — | — |
| Component (G) | (G-1) | — | — | — |
| Addition reaction controlling agent (Compound of the formula (32)) | | 0.50 | 0.50 | 0.50 |
| SiH groups/vinyl groups (ratio of numbers) | | 0.90 | 0.95 | 1.0 |
| Results of evaluation of cured products | | | | |
| Thermal conductivity of cured product (W/m · K) | | 1.0 | 1.0 | 2.0 |
| Hardness of cured product (durometer E) | | 60 | 36 | 45 |

TABLE 2

| Components (parts by weight) | | Composition 4 | Composition 5 |
|---|---|---|---|
| Component (A) | (A-1) | 100 | 100 |
| | (A-2) | — | — |
| Component (B) | (B-1) | — | — |
| | (B-2) | 21.8 | 24.4 |
| Component (C) | (C-1) | 0.60 | 0.60 |
| Component (D) | (D-1) | 800 | 800 |
| | (D-2) | 300 | 400 |
| | (D-3) | 200 | 400 |
| | (D-4) | 200 | 400 |
| Component (E) | (E-1) | 150 | 40.0 |
| | (E-2) | — | — |
| Component (F) | (F-1) | — | — |
| | (F-2) | — | 140 |
| Component (G) | (G-1) | 5.0 | 15.0 |
| Addition reaction controlling agent (Compound of the formula (32)) | | 0.50 | 0.50 |
| SiH groups/vinyl groups (ratio of numbers) | | 1.0 | 1.0 |
| Results of evaluation of cured products | | | |
| Thermal conductivity of cured product (W/m · K) | | 2.2 | 2.7 |
| Hardness of cured product (durometer E) | | 8 | 20 |

TABLE 3

| | Composition 1 | Composition 2 | Composition 3 |
|---|---|---|---|
| Thermal conductivity of cured product before ATF immersion (W/m · K) | 1.0 | 1.0 | 2.0 |
| Thermal conductivity of cured product after ATF immersion (W/m · K) | 1.0 | 1.0 | 2.0 |

TABLE 4

| | Composition 4 | Composition 5 |
|---|---|---|
| Thermal conductivity of cured product before ATF immersion (W/m · K) | 2.2 | 2.7 |
| Thermal conductivity of cured product after ATF immersion (W/m · K) | 2.2 | 2.7 |

[Press Formability (1) of Thermally Conductive Sheet Products]

Example 1

A 100 μm thick PET film was placed on a metal plate. Next, a mold consisting of a 13 mm×13 mm×1 mm frame was placed on the PET film. The composition 1 described in Table 1 was poured to fill the inside of the frame. Another of the PET film was placed on top, and a metal plate was placed thereon. The resultant stack was press-heated with a hot press forming machine at a pressure of 10 MPa and 120° C. for 10 minutes. The upper and lower metal plates were removed from the stack, and a single-edged knife was inserted along the mold frame to cut out a 13 mm×13 mm×1.2 mm thermally conductive sheet product in which the PET films were attached on both sides of a thermally conductive sheet. The thermally conductive sheet product obtained is the same as illustrated in FIG. 1.

Example 2

Press forming was performed in the same manner as in Example 1, except that the composition 1 in Example 1 was replaced by the composition 2 described in Table 1. A thermally conductive sheet product was thus obtained in which the PET films were attached on both sides of a thermally conductive sheet.

Example 3

Press forming was performed in the same manner as in Example 1, except that the composition 1 in Example 1 was replaced by the composition 2 described in Table 1, and that the 100 μm PET film to be placed on top of the composition was changed to a 100 μm thick PET film surface-treated with fluorine-containing silicone release agent X-70-201S (manufactured by Shin-Etsu Chemical Co., Ltd.). A thermally conductive sheet product was thus obtained in which the PET film was attached on the lower side (one side) of a thermally conductive sheet and the PET film surface-treated with fluorine-containing silicone release agent X-70-201S was attached on the upper side (one side). The thermally conductive sheet product obtained is the same as illustrated in FIG. 2.

Example 4

Press forming was performed in the same manner as in Example 1, except that the composition 1 in Example 1 was replaced by the composition 3 described in Table 1, and that the 100 μm PET films to be placed over and under the composition were changed to 100 Mm thick PET films surface-treated with fluorine-containing silicone release agent X-70-201S (manufactured by Shin-Etsu Chemical Co., Ltd.). A thermally conductive sheet product was thus obtained in which the PET films surface-treated with fluorine-containing silicone release agent X-70-201S were attached on both sides of a thermally conductive sheet. The thermally conductive sheet product obtained is the same as illustrated in FIG. 3.

Example 5

Press forming was performed in the same manner as in Example 1, except that the composition 1 in Example 1 was replaced by the composition 4 described in Table 1, and that the 100 μm PET film to be placed under the composition was changed to a 100 μm thick PET film surface-treated with fluorine-containing silicone release agent X-70-220S (manufactured by Shin-Etsu Chemical Co., Ltd.). A thermally conductive sheet product was thus obtained in which the PET film surface-treated with fluorine-containing silicone release agent X-70-220S was attached on the lower side (one side) of a thermally conductive sheet and the PET film was attached on the upper side (one side).

Example 6

Press forming was performed in the same manner as in Example 1, except that the composition 1 in Example 1 was replaced by the composition 5 described in Table 1, and that the 100 μm PET films to be placed over and under the composition were changed to 100 μm thick PET films surface-treated with fluorine-containing silicone release agent X-70-220S (manufactured by Shin-Etsu Chemical Co., Ltd.). A thermally conductive sheet product was thus obtained in which the PET films surface-treated with fluorine-containing silicone release agent X-70-220S were attached on both sides of a thermally conductive sheet.

Comparative Example 1

Press forming was performed in the same manner as in Example 1, except that the PET films were not placed over or under the composition 1 in Example 1. The thermally conductive sheet composed of a cured product of the composition 1 adhered to the upper and lower metal plates. The thermally conductive sheet after being slowly removed from the metal plates was partially deformed and was partially nonuniform in thickness.

Comparative Example 2

Press forming was performed in the same manner as in Example 2, except that the PET films were not placed over or under the composition 2 in Example 2. The thermally conductive sheet composed of a cured product of the composition 2 adhered to the upper and lower metal plates. The thermally conductive sheet after being slowly removed from the metal plates was partially deformed and was partially nonuniform in thickness.

Comparative Example 3

Press forming was performed in the same manner as in Example 4, except that the PET films surface-treated with fluorine-containing silicone release agent X-70-201S were not placed over or under the composition 3 in Example 4. The thermally conductive sheet composed of a cured product of the composition 3 adhered to the metal plates. The thermally conductive sheet after being slowly removed from the metal plates was partially deformed and was partially nonuniform in thickness.

Comparative Example 4

Press forming was performed in the same manner as in Example 5, except that the PET film surface-treated with fluorine-containing silicone release agent X-70-220S was not placed under the composition 4 in Example 5 and that the PET film was not placed on the composition. The thermally conductive sheet formed from the composition 4 adhered to the metal plates. The adhesion to the metal plates was so strong that the thermally conductive sheet was partially broken when removed from the metal plates.

Comparative Example 5

Press forming was performed in the same manner as in Example 6, except that the PET films surface-treated with fluorine-containing silicone release agent X-70-220S were not placed over or under the composition 5 in Example 6. The thermally conductive sheet formed from the composition 5 adhered to the metal plates. The adhesion to the metal plates was so strong that the thermally conductive sheet was partially broken when removed from the metal plates.

[Foreign Matter Adhesion Resistance of Thermally Conductive Sheet Products Produced by Continuous Forming Method]

Example 7

Using a multi-coater, the composition 1 described in Table 1 was continuously applied to a 100 μm thick PET film so as to have a thickness of 1 mm and was subsequently heated in a heating furnace at 120° C. for 10 minutes to form a 1 mm thick thermally conductive sheet on the PET film. Next, a PET film was attached onto the thermally conductive sheet with use of a lamination roll. A thermally conductive sheet product was thus obtained in which the PET films were attached on both sides of the thermally conductive sheet. A metal powder having a diameter of 0.3 mm was sprinkled on the surface of the PET film of the thermally conductive sheet product, and the thermally conductive sheet product was turned 1800 so that the surface of the PET film on which the metal powder had been sprinkled would be downward. Subsequently, the surface of the PET film was visually inspected, and the foreign matter adhesion resistance of the thermally conductive sheet product was rated as "○" (resistant to adhesion of foreign matter) when the surface was free of the metal powder, and was rated as "x" (prone to adhesion of foreign matter) when the metal powder adhered thereto. The evaluation results were "○" for both sides.

Example 8

Continuous forming was performed in the same manner as in Example 7, except that the composition 1 in Example 7 was replaced by the composition 2 described in Table 1. A thermally conductive sheet product was thus obtained in which PET films were attached on both sides of a thermally conductive sheet. The results of the evaluation of the foreign matter adhesion resistance thereof were "○" for both sides.

Example 9

Continuous forming was performed in the same manner as in Example 7, except that the composition 1 in Example 7 was replaced by the composition 2 described in Table 1, and that the PET film to which the composition 2 would be applied was changed to a 100 μm thick PET film surface-treated with fluorine-containing silicone release agent X-70-201S. A thermally conductive sheet product was thus obtained in which the PET film surface-treated with fluorine-containing silicone release agent X-70-201S was attached on the lower side (one side) of a thermally conductive sheet and the PET film was attached on the upper side (one side). The results of the evaluation of the foreign matter adhesion resistance thereof were "○" for both sides.

Example 10

Continuous forming was performed in the same manner as in Example 7, except that the composition 1 in Example 7 was replaced by the composition 3 described in Table 1, and that the PET film to which the composition 3 would be applied and the PET film to be attached onto a thermally conductive sheet composed of a cured product of the composition 3 were changed to 100 μm thick PET films surface-treated with fluorine-containing silicone release agent X-70-201S. A thermally conductive sheet product was thus obtained in which the PET films surface-treated with fluorine-containing silicone release agent X-70-201S were attached on both sides of the thermally conductive sheet. The results of the evaluation of the foreign matter adhesion resistance thereof were "○" for both sides.

Example 11

Continuous forming was performed in the same manner as in Example 7, except that the composition 1 in Example 7 was replaced by the composition 4 described in Table 1, and that the PET film to which the composition 4 would be applied was changed to a 100 μm thick PET film surface-treated with fluorine-containing silicone release agent X-70-220S. A thermally conductive sheet product was thus obtained in which the PET film surface-treated with fluorine-containing silicone release agent X-70-220S was attached on the lower side (one side) of a thermally conductive sheet and the PET film was attached on the upper side (one side). The results of the evaluation of the foreign matter adhesion resistance thereof were "○" for both sides.

Example 12

Continuous forming was performed in the same manner as in Example 7, except that the composition 1 in Example 7 was replaced by the composition 5 described in Table 1, and that the PET film to which the composition 5 would be applied and the PET film to be attached onto a thermally conductive sheet composed of a cured product of the composition 5 were changed to 100 μm thick PET films surface-treated with fluorine-containing silicone release agent X-70-220S. A thermally conductive sheet product was thus obtained in which the PET films surface-treated with fluorine-containing silicone release agent X-70-220S were attached on both sides of the thermally conductive sheet. The results of the evaluation of the foreign matter adhesion resistance thereof were "○" for both sides.

Comparative Example 6

Continuous forming was performed in the same manner as in Example 7, except that the PET film was not attached onto the thermally conductive sheet in Example 7 using a lamination roll. A thermally conductive sheet product was thus obtained in which the PET film was attached on only the lower side of the thermally conductive sheet. The results of the evaluation of the foreign matter adhesion resistance thereof were "O" for the side having the PET film, but "x" for the side without the PET film (the surface of the thermally conductive sheet itself).

Comparative Example 7

Continuous forming was performed in the same manner as in Example 8, except that the PET film was not attached onto the thermally conductive sheet in Example 8 using a lamination roll. A thermally conductive sheet product was thus obtained in which the PET film was attached on only the lower side of the thermally conductive sheet. The results of the evaluation of the foreign matter adhesion resistance thereof were "○" for the side having the PET film, but "x" for the side without the PET film (the surface of the thermally conductive sheet itself).

Comparative Example 8

Continuous forming was performed in the same manner as in Example 9, except that the PET film was not attached onto the thermally conductive sheet in Example 9 using a lamination roll. A thermally conductive sheet product was thus obtained in which the PET film surface-treated with fluorine-containing silicone release agent X-70-201S was attached on only the lower side of the thermally conductive sheet. The results of the evaluation of the foreign matter adhesion resistance thereof were "○" for the side having the PET film, but "x" for the side without the PET film (the surface of the thermally conductive sheet itself).

Comparative Example 9

Continuous forming was performed in the same manner as in Example 10, except that the PET film surface-treated with fluorine-containing silicone release agent X-70-201S was not attached onto the thermally conductive sheet in Example 10 using a lamination roll. A thermally conductive sheet product was thus obtained in which the PET film surface-treated with fluorine-containing silicone release agent X-70-201S was attached on only the lower side of the thermally conductive sheet. The results of the evaluation of the foreign matter adhesion resistance thereof were "○" for the side having the PET film, but "x" for the side without the PET film (the surface of the thermally conductive sheet itself).

Comparative Example 10

Continuous forming was performed in the same manner as in Example 11, except that the PET film was not attached onto the thermally conductive sheet in Example 11 using a lamination roll. A thermally conductive sheet product was thus obtained in which the PET film surface-treated with fluorine-containing silicone release agent X-70-220S was attached on only the lower side of the thermally conductive sheet. The results of the evaluation of the foreign matter adhesion resistance thereof were "○" for the side having the PET film, but "x" for the side without the PET film (the surface of the thermally conductive sheet itself).

Comparative Example 11

Continuous forming was performed in the same manner as in Example 12, except that the PET film surface-treated with fluorine-containing silicone release agent X-70-220S was not attached onto the thermally conductive sheet in Example 12 using a lamination roll. A thermally conductive sheet product was thus obtained in which the PET film surface-treated with fluorine-containing silicone release agent X-70-220S was attached on only the lower side of the thermally conductive sheet. The results of the evaluation of the foreign matter adhesion resistance thereof were "○" for the side having the PET film, but "x" for the side without the PET film (the surface of the thermally conductive sheet itself).

[Releasability (1) of Films from Thermally Conductive Sheets]

Example 13

The PET films surface-treated with fluorine-containing silicone release agent X-70-201S that had been attached on both sides of the thermally conductive sheet of Example 4 were manually peeled off. The releasability of the films from the thermally conductive sheet was evaluated as "○" when the films were easily peeled and there were no residues of the thermally conductive sheet on the films, and was evaluated as "x" when the films were peeled but there was a residue of the thermally conductive sheet on the films. The releasability of the PET films surface-treated with fluorine-containing silicone release agent X-70-201S was "○".

Example 14

The releasability of the PET films surface-treated with fluorine-containing silicone release agent X-70-220S that had been attached on both sides of the thermally conductive sheet of Example 6 was "○".

Reference Example 1

The releasability of the PET films that had been attached on both sides of the thermally conductive sheet of Example 1 was "x".

Reference Example 2

The releasability of the PET films that had been attached on both sides of the thermally conductive sheet of Example 2 was "x".

Reference Example 3

The releasability of the PET film that had been attached on the lower side (one side) of the thermally conductive sheet of Example 3 was "x", and the releasability of the PET film surface-treated with fluorine-containing silicone release agent X-70-201S that had been attached on the upper side (one side) was "○".

Reference Example 4

The releasability of the PET film surface-treated with fluorine-containing silicone release agent X-70-220S that had been attached on the lower side (one side) of the thermally conductive sheet of Example 5 was "○", and the releasability of the PET film that had been attached on the upper side (one side) was "x".

[Press Formability (2) of Thermally Conductive Sheet Products]

Example 15

Press forming was performed in the same manner as in Example 1, except that the 100 μm thick PET films in Example 1 were replaced by 100 μm thick polyethylene films. A thermally conductive sheet product was thus obtained in which the polyethylene films were attached on both sides of a thermally conductive sheet.

Example 16

Press forming was performed in the same manner as in Example 1, except that the 100 μm thick PET films in Example 1 were replaced by 100 μm thick poly(4-methyl-1-pentene) films. A thermally conductive sheet product was thus obtained in which the poly(4-methyl-1-pentene) films were attached on both sides of a thermally conductive sheet.

Example 17

Press forming was performed in the same manner as in Example 1, except that the 100 μm thick PET films in Example 1 were replaced by 100 μm thick polytetrafluoroethylene films. A thermally conductive sheet product was thus obtained in which the polytetrafluoroethylene films were attached on both sides of a thermally conductive sheet.

Example 18

Press forming was performed in the same manner as in Example 2, except that the 100 μm thick PET films in Example 2 were replaced by 100 μm thick polyethylene films. A thermally conductive sheet product was thus obtained in which the polyethylene films were attached on both sides of a thermally conductive sheet.

Example 19

Press forming was performed in the same manner as in Example 2, except that the 100 μm thick PET films in Example 2 were replaced by 100 μm thick poly(4-methyl-1-pentene) films. A thermally conductive sheet product was thus obtained in which the poly(4-methyl-1-pentene) films were attached on both sides of a thermally conductive sheet.

Example 20

Press forming was performed in the same manner as in Example 2, except that the 100 μm thick PET films in Example 2 were replaced by 100 μm thick polytetrafluoroethylene films. A thermally conductive sheet product was thus obtained in which the polytetrafluoroethylene films were attached on both sides of a thermally conductive sheet.

[Releasability (2) of Films from Thermally Conductive Sheets]

Reference Example 5

The releasability of the polyethylene films that had been attached on both sides of the thermally conductive sheet of Example 15 was "x".

Reference Example 6

The releasability of the poly(4-methyl-1-pentene) films that had been attached on both sides of the thermally conductive sheet of Example 16 was "x".

Reference Example 7

The releasability of the polytetrafluoroethylene films that had been attached on both sides of the thermally conductive sheet of Example 17 was "x".

Reference Example 8

The releasability of the polyethylene films that had been attached on both sides of the thermally conductive sheet of Example 18 was "x".

Reference Example 9

The releasability of the poly(4-methyl-1-pentene) films that had been attached on both sides of the thermally conductive sheet of Example 19 was "x".

Reference Example 10

The releasability of the polytetrafluoroethylene films that had been attached on both sides of the thermally conductive sheet of Example 20 was "x".

In Tables 1 and 2, the thermal conductivity at 25° C. of the cured products obtained by curing the compositions 1 to 5 that were thermally conductive fluorine-containing curable compositions was 1.0 W/m·K or more. Furthermore, the hardness of the cured products was 60 or less as measured with the type E durometer.

In Tables 3 and 4, the thermal conductivity at 25° C. of the cured products obtained by curing the thermally conductive fluorine-containing curable compositions did not change before and after the immersion in ATF.

From the above results, the cured products obtained by curing the thermally conductive fluorine-containing curable compositions are excellent in oil resistance and thermal conductivity and are suited as heat transfer members in electric/electronic parts, in particular, on-vehicle electric/electronic parts.

The thermally conductive sheet products of Examples 1 to 6 and Examples 15 to 20 of the present invention were produced by a press forming method, and no problems were encountered in press formability.

In contrast, the press forming in Comparative Examples 1 to 5 encountered problems in which the thermally conductive sheet adhered to the metal plates and an attempt to remove the thermally conductive sheet from the metal plates deformed the thermally conductive sheet and resulted in uneven thickness or breakage.

The thermally conductive sheet products of Examples 7 to 12 of the present invention were produced by a continuous forming method, and no foreign matter adhered thereto.

In contrast, the thermally conductive sheet products of Comparative Examples 6 to 11, which were produced by a continuous forming method, had a problem in which foreign matter adhered to the side free of the film (the surface of the thermally conductive sheet itself).

In the thermally conductive sheet products of Examples 13 and 14 of the present invention, the PET films surface-treated with fluorine-containing silicone release agent X-70-201S or X-70-220S were easily peeled from the thermally conductive sheet, and there were no residues of the thermally conductive sheet on the films that had been peeled.

In the thermally conductive sheet products of Examples 1 to 3, 5, and Examples 15 to 20, on the other hand, the films that had not been surface-treated with the fluorine-containing silicone release agent, such as fluorine-containing silicone release agent X-70-201S or X-70-220S, were peeled from the thermally conductive sheet together with residues of the thermally conductive sheet on the films. However, these thermally conductive sheet products can be interposed between a heat-generating member and a heat-dissipating member without peeling of the films.

Based on the above results, the thermally conductive sheet products of the present invention have electrically insulating films attached on both sides of a thermally conductive sheet composed of a cured product with excellent oil resistance and thermal conductivity, can be produced by a press forming method, and are free of a problem in which the thermally conductive sheet adheres to metal plates and are therefore interposable between a heat-generating member and a heat-dissipating member without adhering to the members to offer good interposing workability. Furthermore, the thermally conductive sheet can be protected from foreign matter and the like. Thus, the thermally conductive sheet products of the present invention are suited as heat transfer members in electric/electronic parts, in particular, on-vehicle electric/electronic parts.

The present invention is not limited to the embodiments discussed above. The above embodiments are only illustrative, and the technical scope of the present invention includes any embodiment that has substantially the same configuration as and provides a similar effect to the technical idea described in the claims of the present invention.

REFERENCE SIGNS LIST

1 thermally conductive sheet product
2 electrically insulating film
3 thermally conductive sheet
4 fluorine-containing silicone release agent layer
1' thermally conductive sheet product
1" thermally conductive sheet product

The invention claimed is:

1. A thermally conductive sheet product comprising a thermally conductive sheet and electrically insulating films attached on both sides of the thermally conductive sheet, the thermally conductive sheet comprising a cured product of a thermally conductive fluorine-containing curable composition comprising:

(A) 100 parts by weight of a linear polyfluoro compound having two or more alkenyl groups in one molecule and having a perfluoropolyether structure in a main chain;

(B) a fluorine-containing organohydrogensiloxane having, in one molecule, one or more selected from perfluoroalkyl groups, perfluorooxyalkyl groups, perfluoroalkylene groups, and perfluorooxyalkylene groups, and further having two or more hydrogen atoms directly bonded to silicon atoms (SiH groups), and free of an alkoxy group directly bonded to a silicon atom in the molecule, in an amount such that the amount of hydrogen atoms directly bonded to silicon atoms in the component (B) is 0.50 to 3.0 mol per 1 mol of alkenyl groups contained in the whole of the composition;

(C) a platinum group metal-based catalyst in an amount of 0.1 to 2,000 ppm in terms of the weight of platinum group metal atoms with respect to the component (A);

(D) 100 to 4,000 parts by weight of a thermally conductive filler;

wherein the component (A) is one or more linear polyfluoro compounds selected from the group consisting of the following general formula (6) and the following general formula (7);

(6)

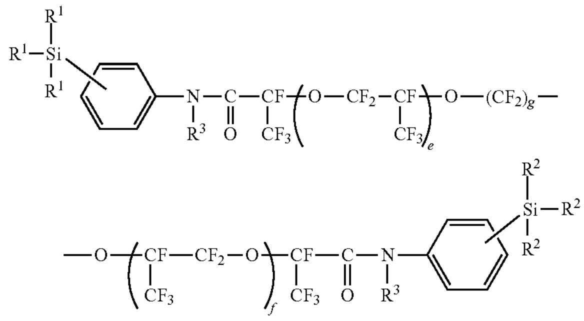

wherein $R^1$ and $R^2$ independently at each occurrence denote an alkenyl group or an unsubstituted or substituted monovalent hydrocarbon group free of an aliphatic unsaturated bond, 2 or more of all of $R^1$ and $R^2$ are alkenyl groups, $R^3$ independently at each occurrence denotes a hydrogen atom or an unsubstituted or substituted monovalent hydrocarbon group, e and f are each an integer of 1 to 150, the average value of e+f is 2 to 300, and g is an integer of 1 to 6, (7)

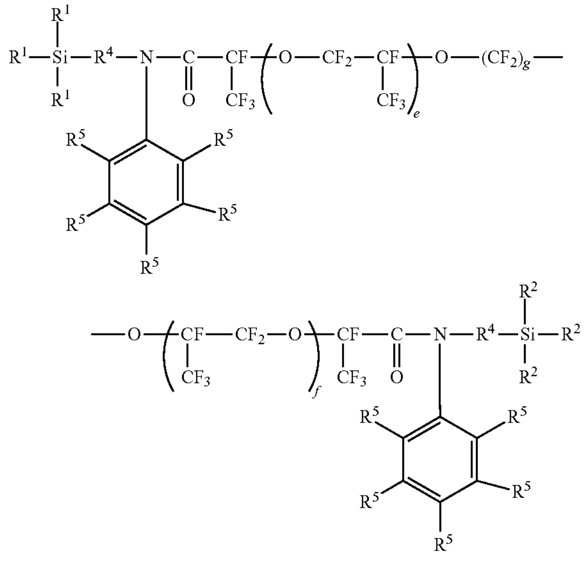

wherein $R^4$ independently at each occurrence denotes an alkylene group having 1 to 6 carbon atoms, $R^5$ independently at each occurrence denotes a hydrogen atom or an alkyl group having 1 to 4 carbon atoms that may be substituted with fluorine, and $R^1$, $R^2$, e, f, and g are the same as above.

2. The thermally conductive sheet product according to claim 1, wherein the electrically insulating films have a thickness of 1 to 200 μm.

3. The thermally conductive sheet product according to claim 1, wherein the electrically insulating films are films of at least one selected from the group consisting of polyolefins, polyimides, polyamides, polyesters, aromatic polyether ketones, fluorine-containing polymers, polyvinyl chlorides, and paper.

4. The thermally conductive sheet product according to claim 1, wherein the electrically insulating films are polyethylene terephthalate (PET) films.

5. The thermally conductive sheet product according to claim 1, wherein at least one of the electrically insulating films is treated with a fluorine-containing silicone release agent on a side in contact with the thermally conductive sheet.

6. The thermally conductive sheet product according to claim 5, wherein the fluorine-containing silicone release agent is an organopolysiloxane having one or more perfluoroalkyl groups or perfluorooxyalkyl groups.

7. The thermally conductive sheet product according to claim 6, wherein the perfluoroalkyl groups or the perfluorooxyalkyl groups are groups having the following general formula (1) or general formula (2):

$$C_{f'}F_{2f'+1}— \quad (1)$$

wherein f' is an integer of 1 to 10, (2)

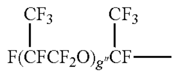

wherein g" is an integer of 1 to 30.

8. The thermally conductive sheet product according to claim 1, wherein the thermally conductive fluorine-containing curable composition further comprises, as a component (E), a fluorine-containing organosilicon compound having, in one molecule, one or more perfluoroalkyl groups or perfluorooxyalkyl groups, and further having one or more alkoxy groups directly bonded to silicon atoms, and free of a hydrogen atom directly bonded to a silicon atom (a SiH group) in the molecule, in an amount of 0.01 to 300 parts by weight per 100 parts by weight of the component (A).

9. The thermally conductive sheet product according to claim 1, wherein the thermally conductive fluorine-containing curable composition further comprises, as a component (F), at least one non-functional polyfluoro compound selected from the group consisting of compounds having the following general formula (3) and the following general formula (4), in an amount of 0.1 to 300 parts by weight per 100 parts by weight of the component (A):

$$F—(CF_2CF_2CF_2O)_a—A \quad (3)$$

wherein A is a group having $—C_bF_{2b+1}$ (b is an integer of 1 to 3) and a is an integer of 1 to 500, $$A—\{(OCF(CF_3)CF_2)_c—(OCF_2CF_2)_d—(OCF_2)_{u'}\}—O—A \quad (4)$$

wherein A is the same as above, c and d are each an integer of 0 to 300, u' is an integer of 1 to 300, c and d are not 0 at the same time, and the repeating units may be randomly arranged.

10. The thermally conductive sheet product according to claim 1, wherein the thermally conductive fluorine-containing curable composition further comprises, as a component (G), a polyfluoromonoalkenyl compound having one alkenyl group in one molecule and having a perfluoropolyether structure in a main chain, in an amount of 0.1 to 100 parts by weight per 100 parts by weight of the component (A).

11. The thermally conductive sheet product according to claim 1, wherein the alkenyl group content in the component (A) is 0.0050 to 0.300 mol/100 g.

12. The thermally conductive sheet product according to claim 1, wherein the perfluoropolyether structure in the component (A) comprises a structure having the following general formula (5):

$$-(C_mF_{2m}O)_n- \quad (5)$$

wherein m is an integer of 1 to 6 and n is an integer of 1 to 300.

13. The thermally conductive sheet product according to claim 1, wherein the component (D) is at least one selected from metals, metal oxides, metal nitrides, metal hydroxides, metal carbides, soft magnetic alloys, and ferrites.

14. The thermally conductive sheet product according to claim 13, wherein the component (D) is alumina.

15. The thermally conductive sheet product according to claim 14, wherein the component (D) is amorphous alumina and/or spherical alumina.

16. The thermally conductive sheet product according to claim 15, wherein the amorphous alumina as the component (D) has an average particle size of 0.2 to 5 μm.

17. The thermally conductive sheet product according to claim 15, wherein the spherical alumina as the component (D) has an average particle size of 5 to 100 μm.

18. The thermally conductive sheet product according to claim 8, wherein the component (E) is a fluorine-containing organosilicon compound having, in one molecule, one or more perfluoroalkyl groups or perfluorooxyalkyl groups bonded to a silicon atom directly bonded to an alkoxy group, via a divalent hydrocarbon group that may contain a carbon atom, a silicon atom, an oxygen atom, and a nitrogen atom.

19. The thermally conductive sheet product according to claim 8, wherein the component (E) is a fluorine-containing organosilicon compound having the following general formula (8):

$$D_{g'}R^{14}_{h'}Si(OR^6)_{4-g'-h'} \quad (8)$$

wherein D independently at each occurrence denotes a perfluoroalkyl group or a perfluorooxyalkyl group bonded to a silicon atom directly bonded to an alkoxy group, via a divalent hydrocarbon group that may contain a carbon atom, a silicon atom, an oxygen atom, and a nitrogen atom, $R^6$ independently at each occurrence denotes an alkyl group having 1 to 6 carbon atoms, $R^{14}$ independently at each occurrence denotes an unsubstituted or substituted monovalent hydrocarbon group, g' is an integer of 1 to 3, h' is an integer of 0 to 2, and g'+h' is an integer of 1 to 3.

20. The thermally conductive sheet product according to claim 10, wherein the component (G) is a polyfluoromonoalkenyl compound having the following general formula (9):

$$Rf-(Y)_h-CH{=}CH_2 \quad (9)$$

wherein Rf is a group having the following general formula (10):

$$F-[CF(CF_3)CF_2O]_i-C_jF_{2j}- \quad (10)$$

wherein i is an integer of 1 to 200 and j is an integer of 1 to 3,

Y is $-CH_2-$, $-OCH_2-$, $-CH_2OCH_2-$, or $-CO-NR^{15}-Z-$ wherein these groups are bonded to Rf at the left end and bonded to the carbon atom at the right end, $R^{15}$ is a hydrogen atom, a methyl group, a phenyl group, or an allyl group, and Z is $-CH_2-$, a group having the following structural formula (Z), or a group having the following structural formula (Z'):

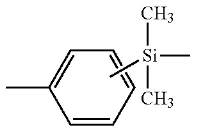

(Z)

wherein the group is an o-, m-, or p-dimethylphenylsilylene group wherein the left end is bonded to the nitrogen atom and the right end is bonded to the carbon atom,

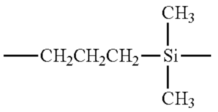

(Z')

wherein the left end is bonded to the nitrogen atom and the right end is bonded to the carbon atom, and h is 0 or 1.

21. The thermally conductive sheet product according to claim 1, wherein the cured product obtained by curing the thermally conductive fluorine-containing curable composition has a thermal conductivity at 25° C. of 1.0 W/m·K or more.

22. The thermally conductive sheet product according to claim 1, wherein the cured product obtained by curing the thermally conductive fluorine-containing curable composition has a hardness of 60 or less as measured with a type E durometer specified in JIS K6253-3.

23. A method for producing the a thermally conductive sheet product according to claim 1, the method comprising a step of hot pressing a thermally conductive fluorine-containing curable composition sandwiched between electrically insulating films to cure the composition into a sheet form, the thermally conductive fluorine-containing curable composition comprising (A), (B), (C) and (D).

24. A method for producing the thermally conductive sheet product according to claim 1, the method comprising a step of coating an electrically insulating film having a long length with a thermally conductive fluorine-containing curable composition, thermally curing the composition, and attaching another of the electrically insulating film onto the cured product, the thermally conductive fluorine-containing curable composition comprising (A), (B), (C) and (D).

25. A thermally conductive sheet product comprising a thermally conductive sheet and electrically insulating films attached on both sides of the thermally conductive sheet, the thermally conductive sheet comprising a cured product of a thermally conductive fluorine-containing curable composition comprising:

(A) 100 parts by weight of a linear polyfluoro compound having two or more alkenyl groups in one molecule and having a perfluoropolyether structure in a main chain;

(B) a fluorine-containing organohydrogensiloxane having, in one molecule, one or more selected from perfluoroalkyl groups, perfluorooxyalkyl groups, perfluoroalkylene groups, and perfluorooxyalkylene groups, and further having two or more hydrogen atoms directly bonded to silicon atoms (SiH groups), and free of an alkoxy group directly bonded to a silicon atom in the molecule, in an amount such that the amount of hydrogen atoms directly bonded to silicon atoms in the component (B) is 0.50 to 3.0 mol per 1 mol of alkenyl groups contained in the whole of the composition;

(C) a platinum group metal-based catalyst in an amount of 0.1 to 2,000 ppm in terms of the weight of platinum group metal atoms with respect to the component (A);

(D) 100 to 4,000 parts by weight of a thermally conductive filler; and (E) a fluorine-containing organosilicon compound having, in one molecule, one or more perfluoroalkyl groups or perfluorooxyalkyl groups, and further having one or more alkoxy groups directly bonded to silicon atoms, and free of a hydrogen atom directly bonded to a silicon atom (a SiH group) in the molecule, in an amount of 0.01 to 300 parts by weight per 100 parts by weight of the component (A).

26. A thermally conductive sheet product comprising a thermally conductive sheet and electrically insulating films attached on both sides of the thermally conductive sheet, the thermally conductive sheet comprising a cured product of a thermally conductive fluorine-containing curable composition comprising:

(A) 100 parts by weight of a linear polyfluoro compound having two or more alkenyl groups in one molecule and having a perfluoropolyether structure in a main chain;

(B) a fluorine-containing organohydrogensiloxane having, in one molecule, one or more selected from perfluoroalkyl groups, perfluorooxyalkyl groups, perfluoroalkylene groups, and perfluorooxyalkylene groups, and further having two or more hydrogen atoms directly bonded to silicon atoms (SiH groups), and free of an alkoxy group directly bonded to a silicon atom in the molecule, in an amount such that the amount of hydrogen atoms directly bonded to silicon atoms in the component (B) is 0.50 to 3.0 mol per 1 mol of alkenyl groups contained in the whole of the composition;

(C) a platinum group metal-based catalyst in an amount of 0.1 to 2,000 ppm in terms of the weight of platinum group metal atoms with respect to the component (A);

(D) 100 to 4,000 parts by weight of a thermally conductive filler; and (F) at least one non-functional polyfluoro compound selected from the group consisting of compounds having the following general formula (3) and the following general formula (4), in an amount of 0.1 to 300 parts by weight per 100 parts by weight of the component (A):

$$F—(CF_2CF_2CF_2O)_a—A \tag{3}$$

wherein A is a group having $—C_bF_{2b+1}$ (b is an integer of 1 to 3) and a is an integer of 1 to 500, $$A—\{(OCF(CF_3)CF_2)_c—(OCF_2CF_2)_d—(OCF_2)_{u'}\}—O—A \tag{4}$$

wherein A is the same as above, c and d are each an integer of 0 to 300, u' is an integer of 1 to 300, c and d are not 0 at the same time, and the repeating units may be randomly arranged.

27. A thermally conductive sheet product comprising a thermally conductive sheet and electrically insulating films attached on both sides of the thermally conductive sheet, the thermally conductive sheet comprising a cured product of a thermally conductive fluorine-containing curable composition comprising:

(A) 100 parts by weight of a linear polyfluoro compound having two or more alkenyl groups in one molecule and having a perfluoropolyether structure in a main chain;

(B) a fluorine-containing organohydrogensiloxane having, in one molecule, one or more selected from perfluoroalkyl groups, perfluorooxyalkyl groups, perfluoroalkylene groups, and perfluorooxyalkylene groups, and further having two or more hydrogen atoms directly bonded to silicon atoms (SiH groups), and free of an alkoxy group directly bonded to a silicon atom in the molecule, in an amount such that the amount of hydrogen atoms directly bonded to silicon atoms in the component (B) is 0.50 to 3.0 mol per 1 mol of alkenyl groups contained in the whole of the composition;

(C) a platinum group metal-based catalyst in an amount of 0.1 to 2,000 ppm in terms of the weight of platinum group metal atoms with respect to the component (A);

(D) 100 to 4,000 parts by weight of a thermally conductive filler; and (G) a polyfluoromonoalkenyl compound having one alkenyl group in one molecule and having a perfluoropolyether structure in a main chain, in an amount of 0.1 to 100 parts by weight per 100 parts by weight of the component (A).

* * * * *